United States Patent
Smith et al.

(10) Patent No.: US 11,805,171 B2
(45) Date of Patent: Oct. 31, 2023

(54) AUTOMATED ETHERNET LAYER 3 (L3) CONNECTIVITY BETWEEN NON-VOLATILE MEMORY EXPRESS OVER FABRIC (NVME-OF) HOSTS AND NVM-OF SUBSYSTEMS USING BIND

(71) Applicant: DELL PRODUCTS L.P., Round Rock, TX (US)

(72) Inventors: Erik Smith, Douglas, MA (US); Martin Gilbert Belanger, Cameron, NC (US); Joseph LaSalle White, San Jose, CA (US); Claudio Desanti, Santa Cruz, CA (US); Douglas Lang Farley, Round Rock, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/486,805

(22) Filed: Sep. 27, 2021

(65) Prior Publication Data

US 2022/0286508 A1      Sep. 8, 2022

Related U.S. Application Data

(63) Continuation-in-part of application No. 17/192,629, filed on Mar. 4, 2021.

(51) Int. Cl.
| | |
|---|---|
| *H04L 67/1097* | (2022.01) |
| *H04L 67/145* | (2022.01) |
| *H04L 61/4511* | (2022.01) |
| *H04L 67/55* | (2022.01) |

(52) U.S. Cl.
CPC ...... *H04L 67/1097* (2013.01); *H04L 61/4511* (2022.05); *H04L 67/145* (2013.01); *H04L 67/55* (2022.05)

(58) Field of Classification Search
CPC . H04L 67/1097; H04L 61/4511; H04L 67/145
See application file for complete search history.

(56) References Cited

U.S. PATENT DOCUMENTS

| | | | | |
|---|---|---|---|---|
| 10,075,524 | B1* | 9/2018 | Bshara | H04L 69/08 |
| 10,409,511 | B1* | 9/2019 | Subbarao | G06F 3/0656 |
| 10,592,144 | B2* | 3/2020 | Roberts | G06F 3/0655 |
| 11,221,972 | B1* | 1/2022 | Raman | H04L 67/60 |
| 11,249,937 | B1* | 2/2022 | Bshara | G06F 13/385 |

(Continued)

OTHER PUBLICATIONS

Non-Final Office Action dated Oct. 31, 2022, in U.S. Appl. No. 17/192,629 (10 Pgs).

(Continued)

*Primary Examiner* — Jimmy H Tran
(74) *Attorney, Agent, or Firm* — NORTH WEBER & BAUGH LLP

(57) ABSTRACT

Systems and methods provide zero-configuration provisioning for modern storage networks such as those utilizing a non-volatile memory express over Fabric (NVMe-oF) system. In various embodiments, this is accomplished by leveraging discovery information, such as multicast Domain Name System (mDNS) information, to locate subsystems in a network and to explicitly and dynamically specify target destinations without a Centralized Discovery Controller (CDC) client having to modify its routing table.

20 Claims, 27 Drawing Sheets

(56) References Cited

U.S. PATENT DOCUMENTS

| | | | | |
|---|---|---|---|---|
| 11,442,652 | B1* | 9/2022 | Dailey | G06F 3/0647 |
| 2007/0156919 | A1* | 7/2007 | Potti | H04L 9/40 |
| | | | | 709/238 |
| 2010/0005190 | A1* | 1/2010 | Shah | H04L 45/04 |
| | | | | 709/235 |
| 2012/0331173 | A1* | 12/2012 | Overcash | H04L 45/306 |
| | | | | 709/238 |
| 2015/0365457 | A1* | 12/2015 | Dvir | H04L 12/18 |
| | | | | 709/219 |
| 2018/0167352 | A1 | 6/2018 | Worley | |
| 2018/0270119 | A1 | 9/2018 | Ballapuram | |
| 2019/0042144 | A1* | 2/2019 | Peterson | G06F 3/061 |
| 2019/0188079 | A1* | 6/2019 | Kohli | G06F 11/1076 |
| 2019/0377496 | A1* | 12/2019 | Olarig | H04L 49/357 |
| 2020/0136943 | A1 | 4/2020 | Banyai | |
| 2020/0136996 | A1* | 4/2020 | Li | H04L 47/125 |
| 2020/0137161 | A1* | 4/2020 | Chintada | H04L 67/61 |
| 2020/0226077 | A1* | 7/2020 | Kang | G06F 13/1668 |
| 2020/0252344 | A1* | 8/2020 | Krivenok | H04L 61/103 |
| 2020/0278893 | A1* | 9/2020 | Niell | H04L 67/10 |
| 2020/0327074 | A1* | 10/2020 | Subbarao | G06F 13/4027 |
| 2020/0409893 | A1 | 12/2020 | Puttagunta | |
| 2021/0064281 | A1* | 3/2021 | Satapathy | H04L 67/1097 |
| 2021/0084085 | A1* | 3/2021 | Jones | H04N 21/6405 |
| 2021/0089236 | A1* | 3/2021 | Yang | G06F 3/0659 |
| 2021/0117242 | A1* | 4/2021 | Van De Groenendaal | |
| | | | | G06F 9/5072 |
| 2021/0243255 | A1* | 8/2021 | Perneti | G06F 3/0659 |
| 2021/0247935 | A1* | 8/2021 | Beygi | G06F 3/067 |
| 2021/0263686 | A1 | 8/2021 | Satapathy | |
| 2021/0334206 | A1* | 10/2021 | Colgrove | G06F 3/0638 |
| 2021/0397351 | A1* | 12/2021 | Dhatchinamoorthy | |
| | | | | G06F 3/0607 |
| 2022/0014592 | A1* | 1/2022 | Kachare | H04Q 9/00 |
| 2022/0027076 | A1* | 1/2022 | Reichbach | G06F 3/0631 |
| 2022/0045969 | A1* | 2/2022 | L'Ecuyer | H04L 49/90 |
| 2022/0050858 | A1* | 2/2022 | Karr | G06F 16/1748 |
| 2022/0066799 | A1* | 3/2022 | Pinto | G06F 9/3877 |
| 2022/0091754 | A1* | 3/2022 | Raman | G06F 3/0659 |
| 2022/0091872 | A1* | 3/2022 | Huilgol | G06F 9/45558 |
| 2022/0164120 | A1* | 5/2022 | Kannan | G06F 3/0659 |
| 2022/0215111 | A1* | 7/2022 | Ekins | G06F 21/6218 |
| 2022/0231905 | A1* | 7/2022 | Dhatchinamoorthy | |
| | | | | H04L 41/0668 |
| 2022/0263898 | A1* | 8/2022 | Jennings | H04L 41/0886 |
| 2023/0026570 | A1* | 1/2023 | Sampathkumar | H04L 67/1044 |

OTHER PUBLICATIONS

"NVM Express TM over Fabrics," revision 1.1, Oct. 29, 2019, [online], [Retrieved Aug. 29, 2022] Retrieved from Internet <URL:https://nvmexpress.org> (83pgs).

Final Office Action dated Mar. 28, 2023, in U.S. Appl. No. 17/192,629. (13 pgs).

Response to Final Office Action filed May 22, 2023, in U.S. Appl. No. 17/192,629. (11 pgs).

Response to Final Office Action filed Jun. 20, 2023, in U.S. Appl. No. 17/192,629. (10 pgs).

Notice of Allownce and Fee(s) Due, dated Jul. 14, 2023, in U.S. Appl. No. 17/192,629. (8 pgs).

\* cited by examiner

_1400_

```
┌─────────────────────────────────────────────────┐
│ ESTABLISH A CONNECTION BETWEEN A DISCOVERY      │
│ CONTROLLER AND A HOST THAT IS ASSOCIATED WITH A │─ 1405
│ DESTINATION DATABASE                            │
└─────────────────────────────────────────────────┘
                        │
                        ▼
┌─────────────────────────────────────────────────┐
│ AT A HOST NETWORK INTERFACE HAVING A HOST       │
│ NETWORK INTERFACE ADDRESS, RECEIVE FROM THE     │─ 1410
│ DISCOVERY CONTROLLER NETWORK INFORMATION        │
│ THAT IDENTIFIES THE DISCOVERY CONTROLLER        │
└─────────────────────────────────────────────────┘
                        │
                        ▼
┌─────────────────────────────────────────────────┐
│ CONNECT TO THE DISCOVERY CONTROLLER BY USING    │
│ THE HOST NETWORK INTERFACE ADDRESS IN A         │
│ TRANSPORT INTERFACE PARAMETER TO ESTABLISH A    │─ 1415
│ PERSISTENT EXPLICIT NETWORK CONNECTION          │
│ BETWEEN THE CDC CLIENT AND THE CDC              │
└─────────────────────────────────────────────────┘
                        │
                        ▼
┌─────────────────────────────────────────────────┐
│ AT THE HOST NETWORK INTERFACE, RECEIVE A        │
│ DESTINATION IP ADDRESS ASSOCIATED WITH A        │─ 1420
│ SUBSYSTEM HAVING A SUBSYSTEM INTERFACE          │
└─────────────────────────────────────────────────┘
                        │
                        ▼
┌─────────────────────────────────────────────────┐
│ CONNECT TO THE SUBSYSTEM INTERFACE TO           │
│ FACILITATE A CONNECTION TO THE STORAGE DEVICE BY│
│ USING THE TRANSPORT INTERFACE PARAMETER TO      │─ 1425
│ SPECIFY THAT THE HOST NETWORK INTERFACE BE      │
│ USED FOR CONNECTING THE CDC CLIENT WITH THE     │
│ SUBSYSTEM INTERFACE                             │
└─────────────────────────────────────────────────┘
```

FIG. 14

AUTOMATED ETHERNET LAYER 3 (L3) CONNECTIVITY BETWEEN NON-VOLATILE MEMORY EXPRESS OVER FABRIC (NVME-OF) HOSTS AND NVM-OF SUBSYSTEMS USING BIND

CROSS-REFERENCE TO RELATED APPLICATION

The present application is a continuation-in-part of and claims priority benefit under 35 USC § 120 to co-pending and commonly-owned U.S. patent application Ser. No. 17/192,629, filed on Mar. 4, 2021, entitled "AUTOMATED INTERNET PROTOCOL (IP) ROUTE UPDATE SERVICE FOR ETHERNET LAYER 3 (L3) IP STORAGE AREA NETWORKS (SANs)," and listing Erik Smith, Joseph LaSalle White, Claudio Desanti, Martin Gilbert Belanger, and Doug Lang Farley as inventors, which patent document is incorporated by reference herein in its entirety and for all purposes.

BACKGROUND

A. Technical Field

The present disclosure relates generally to information handling systems. More particularly, the present disclosure relates to network communications systems and methods, such as automatic IP route update services for L3 Internet Protocol (IP) Storage Area Networks (SANs) and systems and methods that do not require IP route updates.

B. Background

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

IP SAN protocols that operate in an L3 (i.e., routed) topology suffer from IP routing problems related to the concept of having a default gateway, such as only a single default gateway being defined per network namespace. Attempts to mitigate such IP routing problems in existing L3 IP SANs are highly labor-intensive and tend to be prone to error.

Accordingly, it is highly desirable to find new and more efficient ways to overcome IP routing problems in networks such as IP SANs.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

FIG. 14 depicts a flowchart of an exemplary process for dynamically managing connections in an NVMe-oF system, according to embodiments of the present disclosure.

DETAILED DESCRIPTION OF EMBODIMENTS

Figure 1:
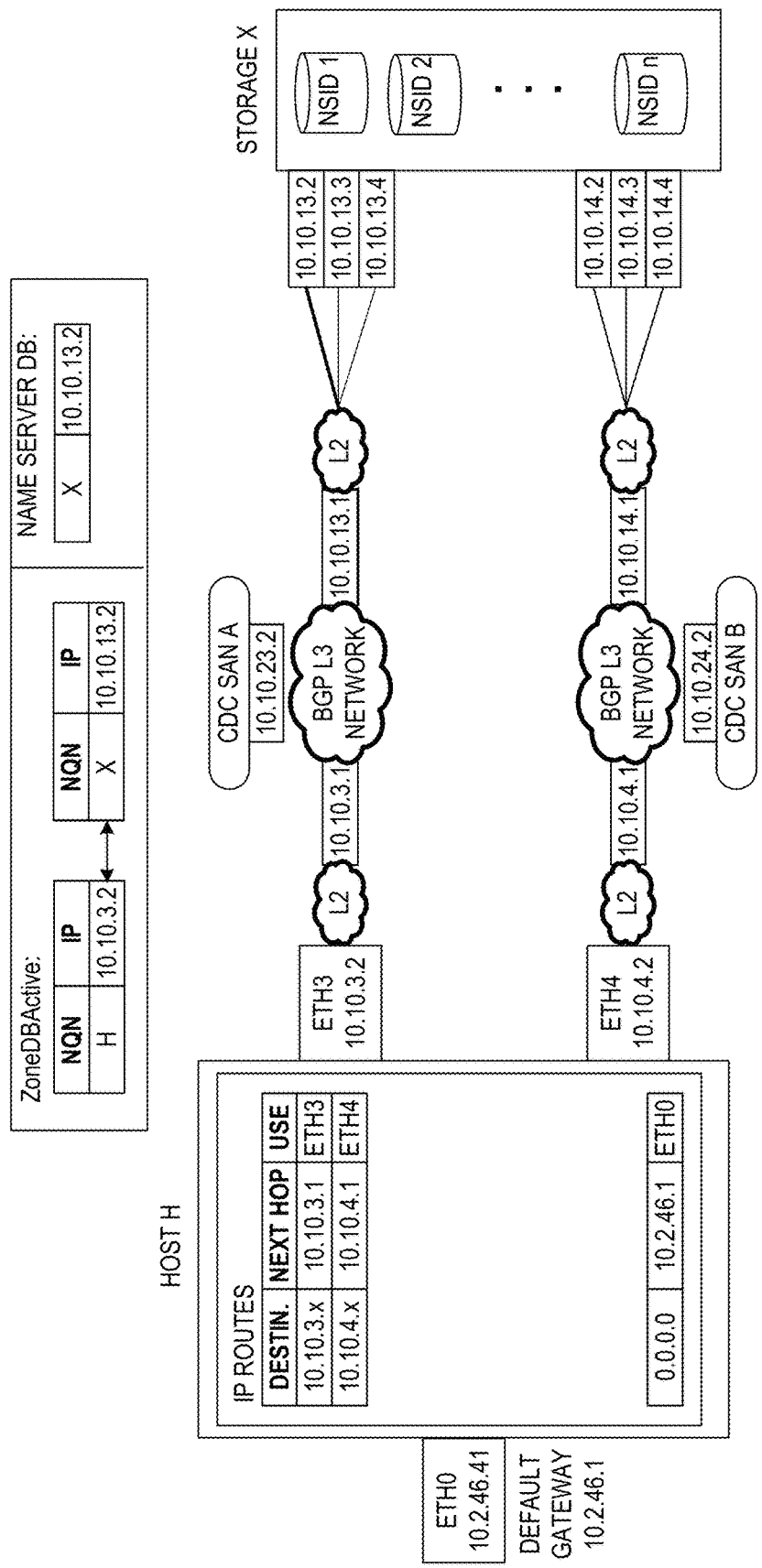
FIG. 1 ("FIG. 1") depicts an exemplary Non-Volatile Memory express over Fabric (NVMe-oF) system, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms, and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

Any headings used herein are for organizational purposes only and shall not be used to limit the scope of the description or the claims. Each reference/document mentioned in this patent document is incorporated by reference herein in its entirety.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

It shall be noted that although embodiments described herein may be generally described within the context of calls, commands, and responses, e.g., an mDNS response, applied to NVMe-oF fabric transports in L3 IP SANs, aspects of the present disclosure are not so limited. Accordingly, the aspects of the present disclosure may be applied or adapted for use in other contexts, using any number and type of commands, information, fabric transport and translating mechanisms, etc., to efficiently exchange information across information handling systems according to the objectives of the present disclosure.

In this document, the terms "routing table" and "IP routing table;" "configuring" and "building" a routing table; and "transport interface parameter" and "tri-face parameter"

are used interchangeably. "Discovery controller" comprises centralized discovery controllers and direct discovery controllers. Each reference/document mentioned herein is incorporated by reference herein in its entirety.

A. Automated IP Route Update Embodiments

FIG. 1 depicts an exemplary NVMe-oF system, according to embodiments of the present disclosure. NVMe-oF system 100 may be implemented as an Ethernet L3 IP SAN and, in one or more embodiments, may comprise Host H and Storage X that, in the example in FIG. 1, are coupled via a routed L3 networks comprising CDCs (denoted as CDC SAN A and CDC SAN B) that may perform discovery and inventory management functions associated with respective SAN A and SAN B. Host H in FIG. 1 is communicatively coupled to three network interfaces eth0, eth3 and eth4 that each may communicate with a different network. As depicted, network interface eth0 has IP address 10.2.46.21, network interface eth3 has IP address 10.10.3.2, and network interface eth4 has IP address 10.10.4.2. A person of skill in the art will appreciate that each interface, in turn, may be communicatively coupled with any number of entities or components. For example, eth3 is communicatively coupled, via CDC SAN A, with ports on Storage X that are denoted as having IP addresses 10.10.13.2 through 10.10.13.4. Similarly, eth4 is communicatively coupled, via CDC SAN B, with ports having IP addresses 10.10.14.2 through 10.10.14.4.

In operation, it is desirable that Host H be able to initiate communication with CDC SAN A and CDC SAN B to discover and communicate with respective ports 10.10.13.2 through 10.10.13.4 and 10.10.14.2 through 10.10.14.4 on Storage X. Assuming that Host H seeks to access Storage X at destination IP address 10.10.13.2 and at IP address 10.10.14.2, since these two destination IPs are considered to be on different networks than Host H (i.e., they do not match any of the existing allowable destination addresses 10.10.3.x or 10.10.4.x that the IP routing table of Host H may be configured for) and since the routing table of Host H contains no entry for either CDC SAN A and CDC SAN B as destination address, Host H would, due to a lack of viable alternatives, route packets to storage port 10.10.13.2 or 10.10.14.2 via interface eth0, having IP address 10.2.46.41. In other words, Host H would utilize an interface that is connected to the default gateway. However, sending out discovery traffic or NVMe-oF traffic via a default gateway, e.g., on a local area network (LAN), is suboptimal for various reasons, including problems associated with mixing transport traffic with a management network to access the same namespace, creating potential network security issues, and the like.

Existing approaches to mitigate such problems involve manually adding routes to Host H's IP routing table, for example, to identify next hop 10.10.3.1 and interface 10.10.3.2 as entries that are associated with the destination IP address 10.10.23.2 for CDC SAN A, such as to ensure that traffic destined for CDC SAN A egresses through interface eth3 instead of the interface connected to the default gateway. To access storage ports 10.10.13.2 and 10.10.14.2 via respective network interfaces eth3 and eth4, IP routes would have to be manually pre-defined. This is typically done by statically configuring IP routes in a manner such that packets sent to storage port 10.10.13.2 will always be sent out from interface eth3, e.g., to the next hop having IP address 10.10.3.1, and packets sent to storage port 10.10.14.2 will always be sent out from interface eth4, e.g., to the next hop having IP address 10.10.4.1.

In practice, this requires the involvement of an administrator who manually adds appropriate routes to Host H's IP routing table, for example, each time a configuration changes. Such approaches are cumbersome and inefficient. In addition, because of the efforts involved with configuring and maintaining static routes, most IP SAN customers prefer to keep host and storage ports on the same Ethernet layer 2 (L2) network to communicate in the same broadcast domain. Overall, these solutions are suboptimal and limit the practical size that an IP storage network can have to about 1,000 ports or less. Accordingly, it would be desirable to have IP SANs that can accommodate up to 10,000 ports or more, e.g., to provide similar scaling characteristics as other NVMe-oF transports (e.g., Fibre Channel).

Various embodiments presented herein allow entities in a network, such as a NVMe-oF network, to obtain and utilize network information that can aid in dynamically managing routing tables to build routes in a manner such that Host H can send out frames through desired interfaces, here, eth3 or eth4, to more efficiently reach target destinations. This provides modern storage networks with connectivity options that enhance data services performance when compared to existing designs. In one or more embodiments, an automated IP routing update service may be used to dynamically create, read, update, and delete functions of otherwise static IP routing table entries to streamline such functions in a storage fabric. As discussed in greater detail below, this may be accomplished by a process that facilitates a combination of information discovered (e.g., via mDNS) or returned in response to the NVMe-oF data transport protocol's Get Log Pages command that may be transmitted to a CDC.

It is noted that the system depicted in FIG. 1 is not limited to the constructional detail shown there or described in the accompanying text. As those skilled in the art will appreciate, embodiments herein are not limited to a dual rail SAN topology with isolated networks that facilitate redundancy. In one or more embodiments, the network in FIG. 1 may comprise, for example, a single CDC and two or more logically separated SANs in the form of logical dual rail SANs.

Figure 2:
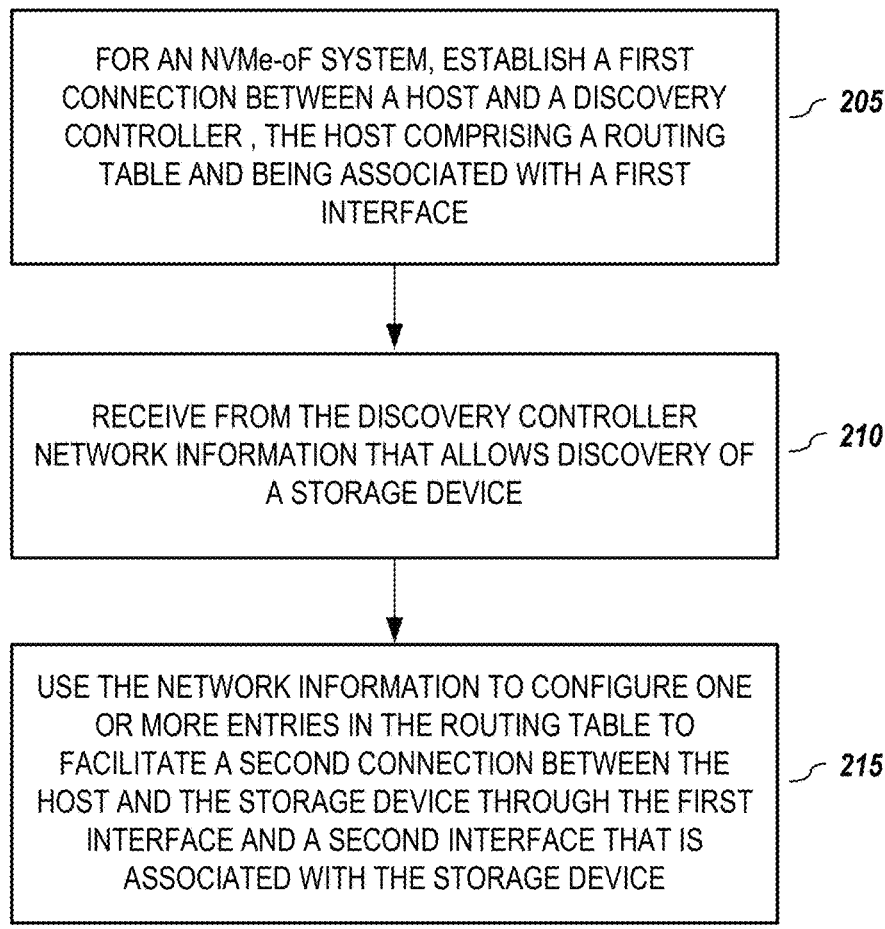
FIG. 2 depicts a flowchart of an exemplary process for dynamically managing routing tables in an NVMe-oF system, according to embodiments of the present disclosure.

FIG. 2 depicts a flowchart of an exemplary process for dynamically managing routing tables in an NVMe-oF system, according to embodiments of the present disclosure. In one or more embodiments, process 200 may begin when, for the NVMe-oF system that may comprise first and second networks or sub-networks, such as the host and storage networks depicted in FIG. 1, a connection is established (205) between a host that may be associated with the first network and a discovery controller that may be associated with the second network. The host may comprise a first interface and be associated with a routing table.

In one or more embodiments, the host may receive (210) from the discovery controller network information that allows discovery of a storage device associated with the second network. The host may use (215) the network information to configure one or more entries in its routing table to facilitate a connection to the storage device, e.g., through the first interface and/or a second interface that is associated with the storage device.

It shall be noted that: (1) certain steps may optionally be performed; (2) steps may not be limited to the specific order set forth herein; (3) certain steps may be performed in different orders; and (4) certain steps may be done concurrently.

Various implementations of process 200 are discussed in greater detail with reference to FIGS. 3, 5-7, and 9-12 below. Not shown are storage management interfaces and other components that one of skill in the art would readily recognize as necessary for the proper operation of a networks such as the NVMe-oF system depicted therein.

Figure 3:
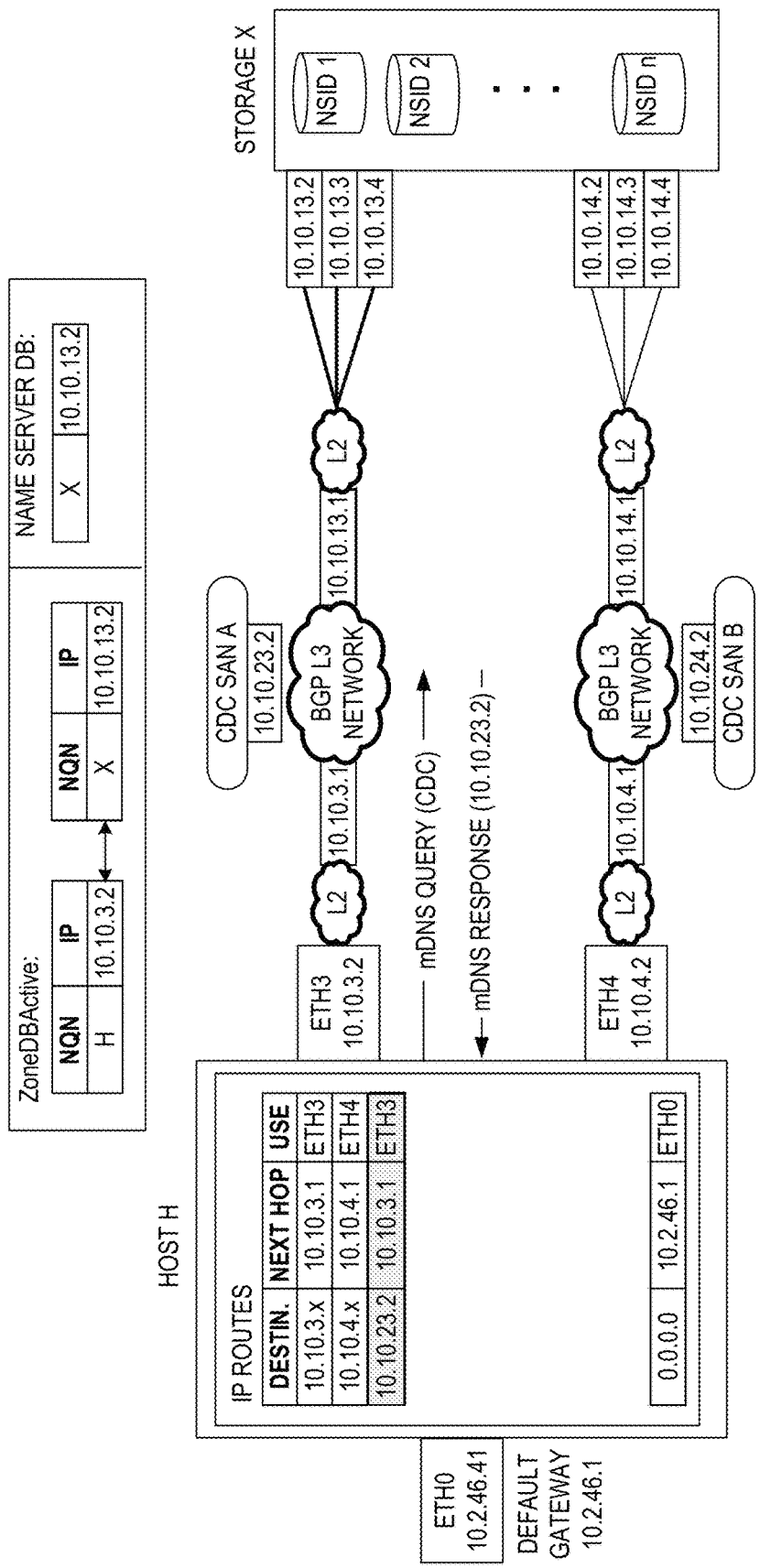
FIG. 3 depicts the use of a multicast Domain Name System (mDNS) query to configure an IP routing table in the exemplary NVMe-oF system in FIG. 1, according to embodiments of the present disclosure.

FIG. 3 depicts the use of an mDNS query to configure an entry in the IP routing table in the exemplary NVMe-oF system in FIG. 1, according to embodiments of the present disclosure. As shown in FIG. 3, ZoneDBActive contains an entry that allows Host H to access interface 10.10.13.2 at Storage X. Further, Name Server DB contains an entry that indicates that interface 10.10.13.2 is connected to Storage X.

In common Fibre Channel (FC) networks, once a host connects to the FC network and a link is established, the host sends out fabric login to a well-known address and receives an FC address identifier that is used as source address to communicate with other FC ports. Unlike in FC networks, hosts in Ethernet networks have no well-known address or other suitable means available to easily obtain the CDC's IP address and route frames to it. Instead, the host must discover the IP address of the CDC. For example, once a host attaches to an Ethernet network, it needs to discover those entities that are attached to that network before accessing exposed NVMe™ namespaces. One or more embodiments herein facilitate easy discovery of IP addresses by utilizing information provided by entities such as CDC SAN A, e.g., self-identifying information that is provided in a response to a query, such as an mDNS query that is sent out on a multicast address (here, via interfaces eth3 and eth4) and that is looking for, e.g., an _nvme-disc or similar service. The response by an entity that supports that service may directly or indirectly identify CDC SAN A. In one or more embodiments, IP address 10.10.23.2 of the CDC that is associated with SAN A may be discovered, e.g., by extracting IP address 10.10.23.2 from the mDNS responses to the mDNS query. The interface at which the mDNS response has been received, e.g., eth3, may be used to create an IP route entry for Host H in Host H's routing table.

In addition, the source IP address (e.g., 10.10.3.1) of the mDNS response may be entered as the next hop address. In this manner, the IP routing table can be dynamically configured and enable Host H to send out frames to the correct destination(s) via predetermined or known interfaces eth3 and eth4.

A person of skill in the art will appreciate that similar considerations apply to CDC SAN B and its IP routing table, which for sake of simplicity is not shown in FIG. 3.

Figure 4:
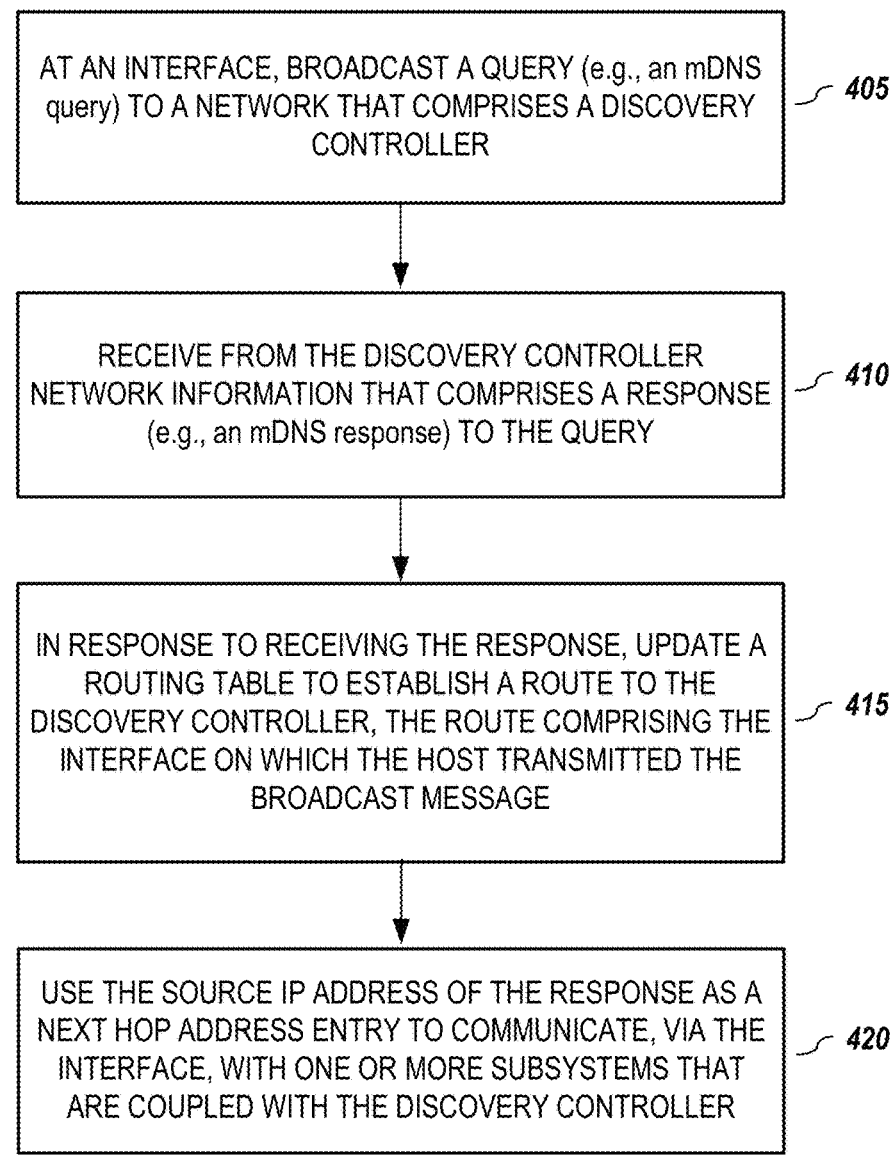
FIG. 4 depicts a flowchart of an exemplary process for using an mDNS query to configure an IP routing table, according to embodiments of the present disclosure.

FIG. 4 depicts a flowchart of an exemplary process for using an mDNS query to configure an IP routing table, according to embodiments of the present disclosure. In one or more embodiments, process 400 may begin when a host broadcasts (405), e.g., at one of its interfaces, a query, such as an mDNS query, to a routed network (e.g., a BGP routed L3 network) that comprises a CDC associated with a SAN.

In one or more embodiments, the host may receive (410) from the discovery controller network information that comprises an mDNS response to the mDNS query. The mDNS response may comprise self-identifying information from the discovery controller, such as an IP address that the host may use to communicate with discovery controller.

In one or more embodiments, in response to receiving the mDNS response, the host may update (415) its routing table, e.g., by configuring one or more table entries, to establish a route to the discovery controller that associates the discovery controller with the interface on which the host transmitted the broadcast message.

In one or more embodiments, updating the routing table may comprise the host using (420) the source IP address of the mDNS response to create an entry for a next hop address. This enables the host to communicate, via the interface, with the discovery controller.

Figure 5:
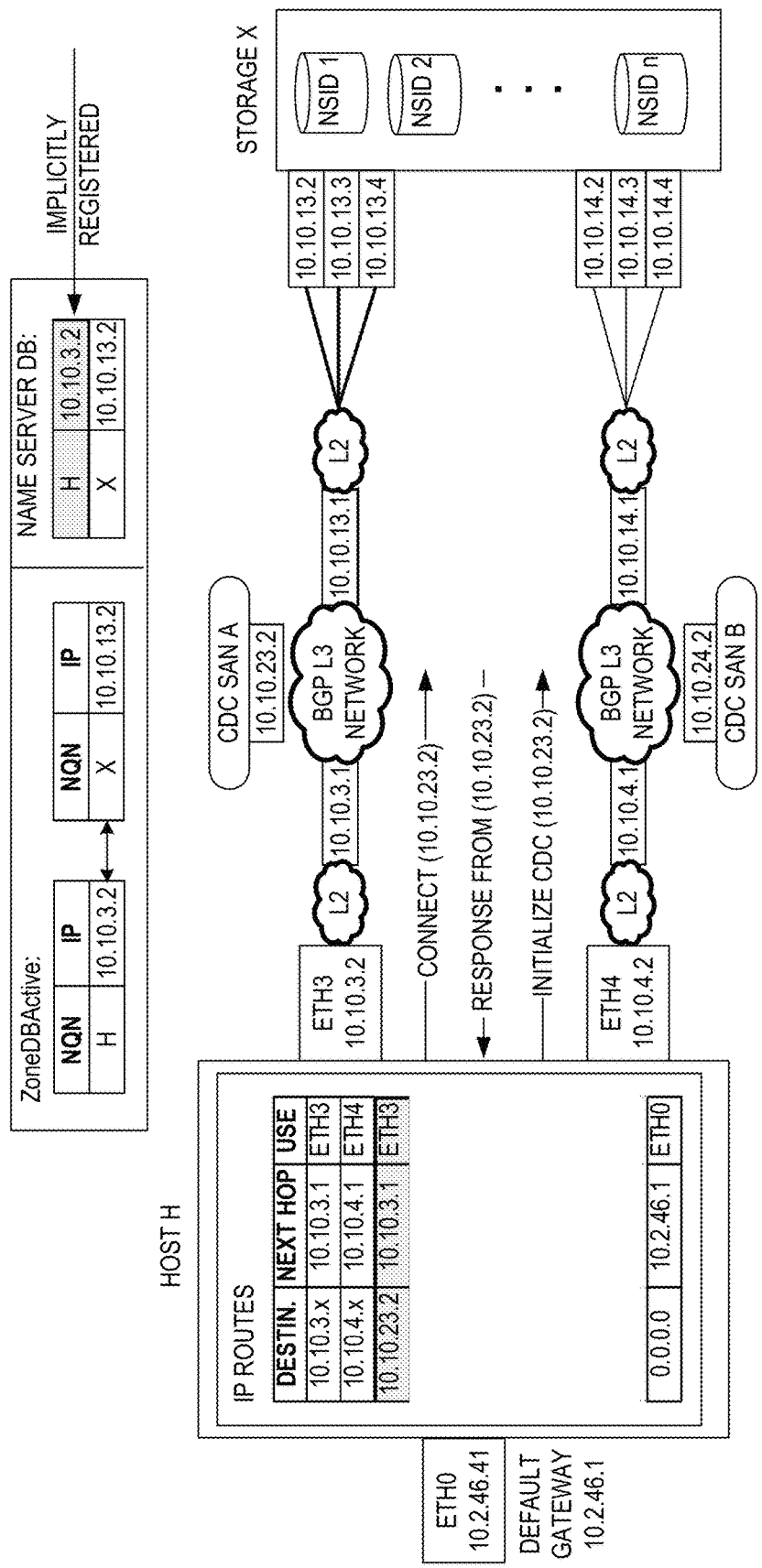
FIG. 5 depicts connecting and initializing a Centralized Discovery Controller (CDC), according to embodiments of the present disclosure.

FIG. 5 depicts connecting and initializing a CDC, according to embodiments of the present disclosure. Same numerals as in FIG. 1 denote similar elements. For purposes of brevity, a description of their functions is not repeated. In one or more embodiments, the result of the discovery of a service via an mDNS query, as illustrated in FIG. 3, may be used in a controller initialization process that involves using the new entry, here in FIG. 5, the destination address 10.10.23.2, the next hop address 10.10.3.1, and interface eth3 to establish a connection and exchange information with CDC SAN A to set up CDC SAN A for certain uses, e.g., according to NVMe™ or other protocols.

In one or more embodiments, once a connection is established, e.g., prior to CDC SAN A sending out a response to a connection request by Host H, CDC SAN A may use some of all information in that connection request to update its name server database, e.g., by adding a NVMe™ Qualified Name (NQN) "H" and the IP address 10.10.3.2 of the Host H's interface to the name server database, to indicate that Host H is implicitly registered with the CDC SAN A's IP address. It is understood that any type of information or command, e.g., a registration command that comprises a symbolic name, may be used to explicitly register Host H with CDC SAN A such as to enable Host H to be more easily identified by the SAN administrator.

Figure 6:
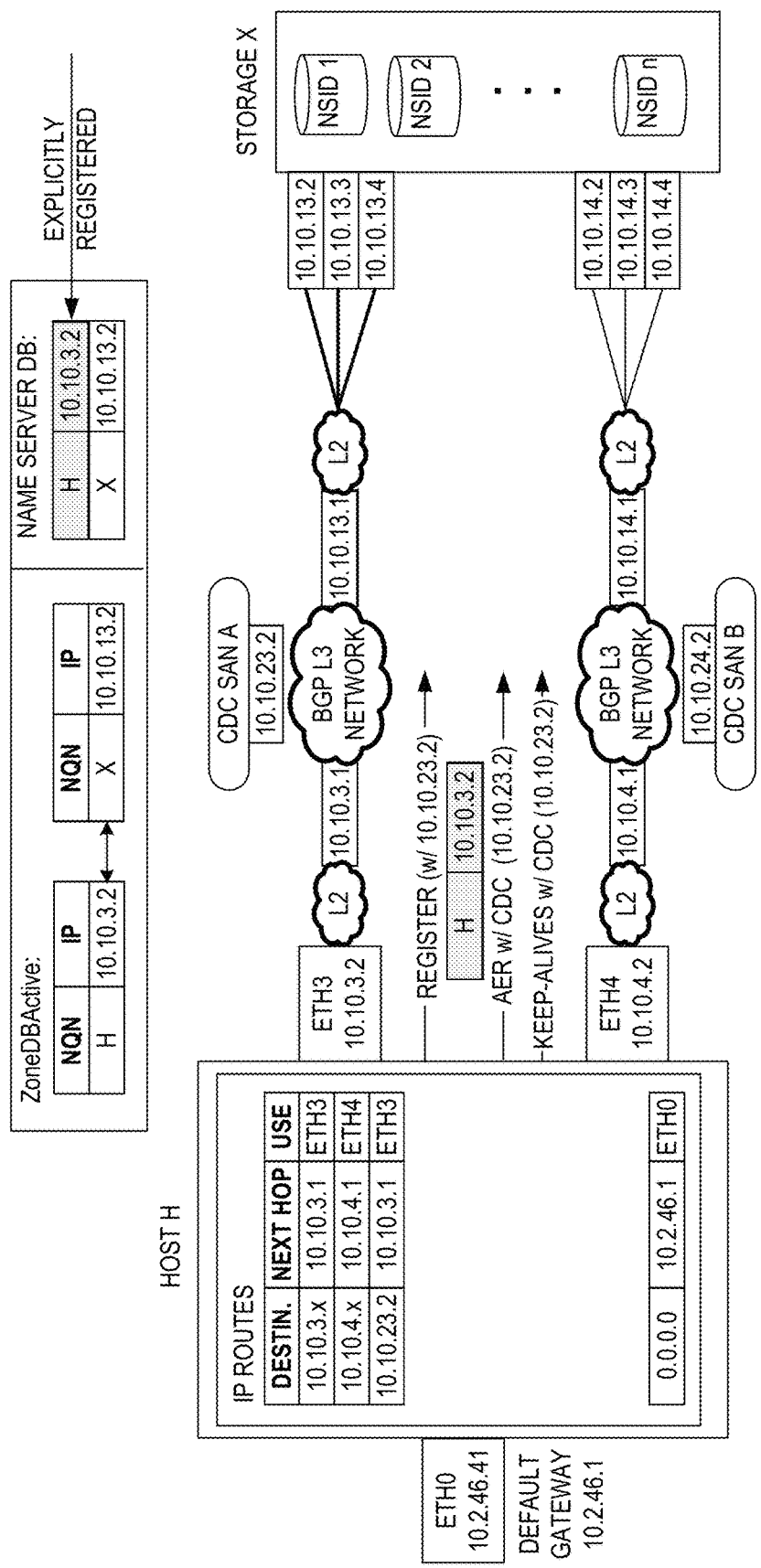
FIG. 6 depicts registering with a CDC, according to embodiments of the present disclosure.

In one or more embodiments, dynamically updating the IP route table and/or name server database, advantageously, enables Host H to connect with and to initialize with CDC SAN A to facilitate proper operation in the NVMe-oF environment depicted in FIG. 5. As depicted in FIG. 6, dynamically updating the IP route table and/or name server database, may further enable Host H to register Host H with CDC SAN A and to communicate Asynchronous Event Registrations (AERs), keep-alive messages, and other information with CDC SAN A.

Figure 7:
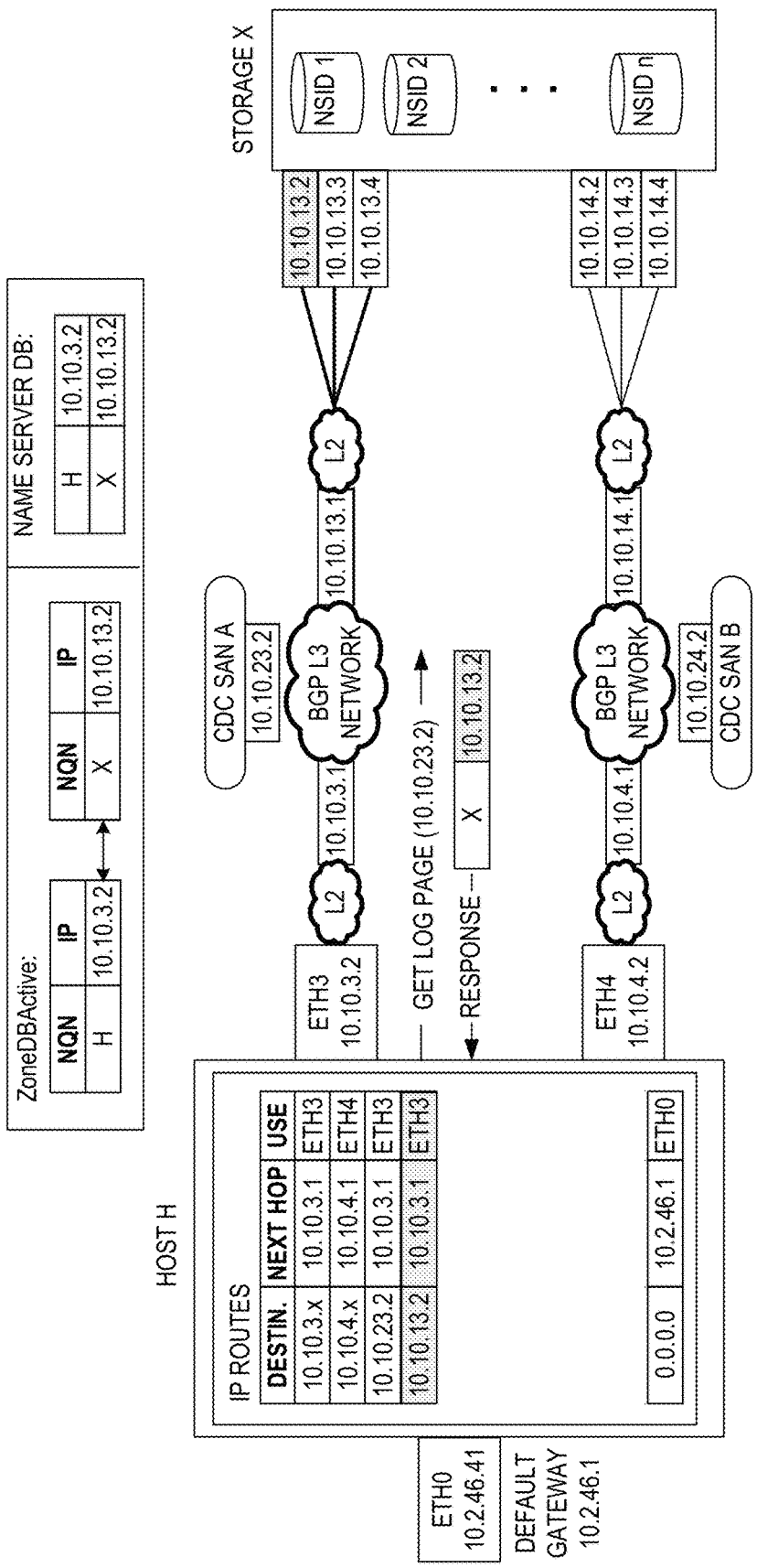
FIG. 7 depicts obtaining network information for configuring an IP routing table, according to embodiments of the present disclosure.

FIG. 7 depicts obtaining network information for configuring entries in an IP routing table, according to embodiments of the present disclosure. In one or more embodiments, once CDC SAN A is set up and initialized, Host H may use CDC SAN A to discover entities, such as ports (e.g., 10.10.13.2) on Storage X that may expose NVMe™ namespaces, i.e., storage targets, that Host H is coupled to via SAN A. In one or more embodiments, discovery may comprise Host H using the acquired entry in its IP routing table, which identifies the CDC SAN A's IP address, to send to CDC SAN A an NVMe-oF Get Log Page command to request one or more discovery log entries. A discovery log entry may comprise information about one or more subsystems, such as for example storage port IP address 10.10.13.2 in FIG. 7.

In one or more embodiments, once CDC SAN A responds to the discovery log entry request, Host H may receive the CDC SAN A's response on eth3 and extract the information about the subsystem, such as NQN X and IP address 10.10.13.2, which may have been stored in the name server database and that may be used to communicate with that subsystem, here at IP address 10.10.13.2. It is noted that subsystems may be located on networks that do not include either Host H or CDC SAN A. In one or more embodiments, Host H may use that information to update its IP route table by inserting an entry that links the subsystem with both interface eth3 and next hop 10.10.3.1, such as to indicate that frames destined for interface address 10.10.13.2 should egress from eth3 and use next hop 10.10.13.1. Stated differently, the routing table entry enables Host H to connect to and access subsystem X, for example, to obtain NVMe™ namespaces.

Figure 8:
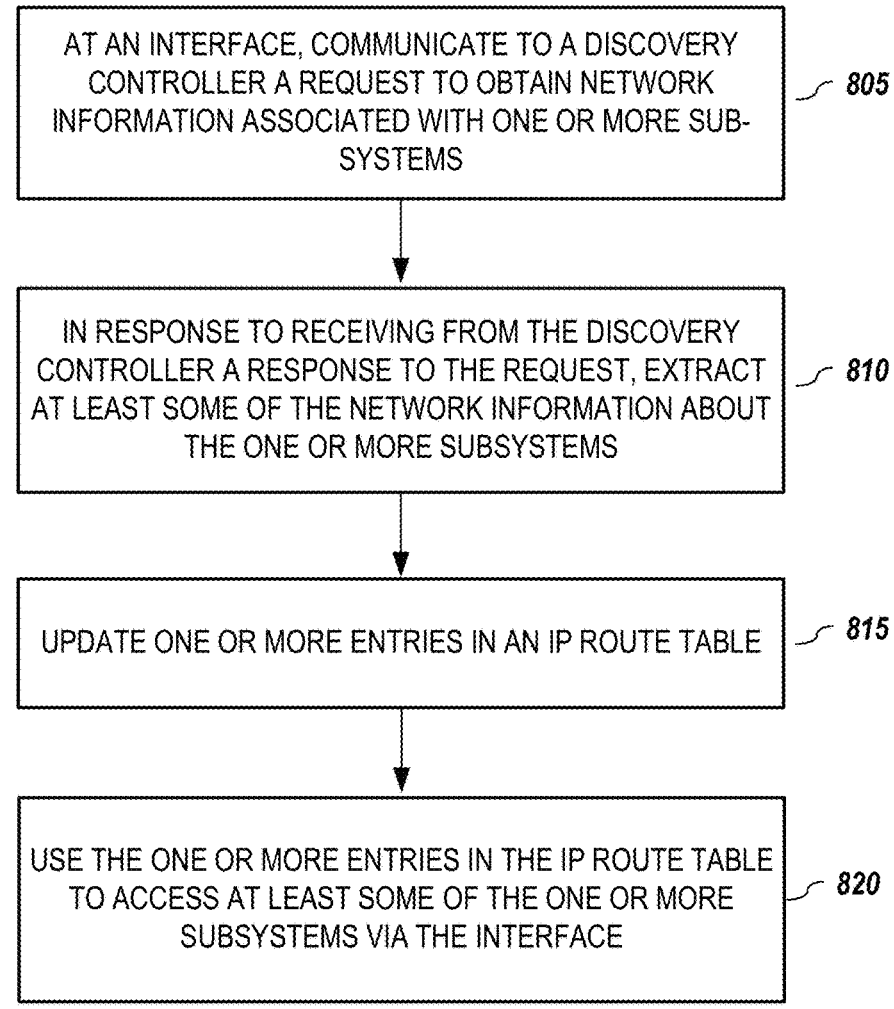
FIG. 8 depicts a flowchart of an exemplary process for obtaining network information for configuring an IP routing table, according to embodiments of the present disclosure.

FIG. 8 depicts a flowchart of an exemplary process for obtaining network information for configuring an IP routing table, according to embodiments of the present disclosure. In one or more embodiments, process 800 may begin when a host, such as a host in an NVME-oF environment, communicates (805) a request to a discovery controller to obtain network information, e.g., discovery log entries associated with one or more subsystems in the NVME-oF environment. The request may comprise, for example, an NVMe-oF Get Log Page command.

In one or more embodiments, in response to the host receiving a response from the discovery controller, e.g., via a predetermined interface, the host may extract (810) the network information about the one or more subsystems, such as an IP address associated with the subsystem, to update (815) its IP route table, e.g., to enable the host to access (820) the subsystem via the predetermined interface.

Figure 9:
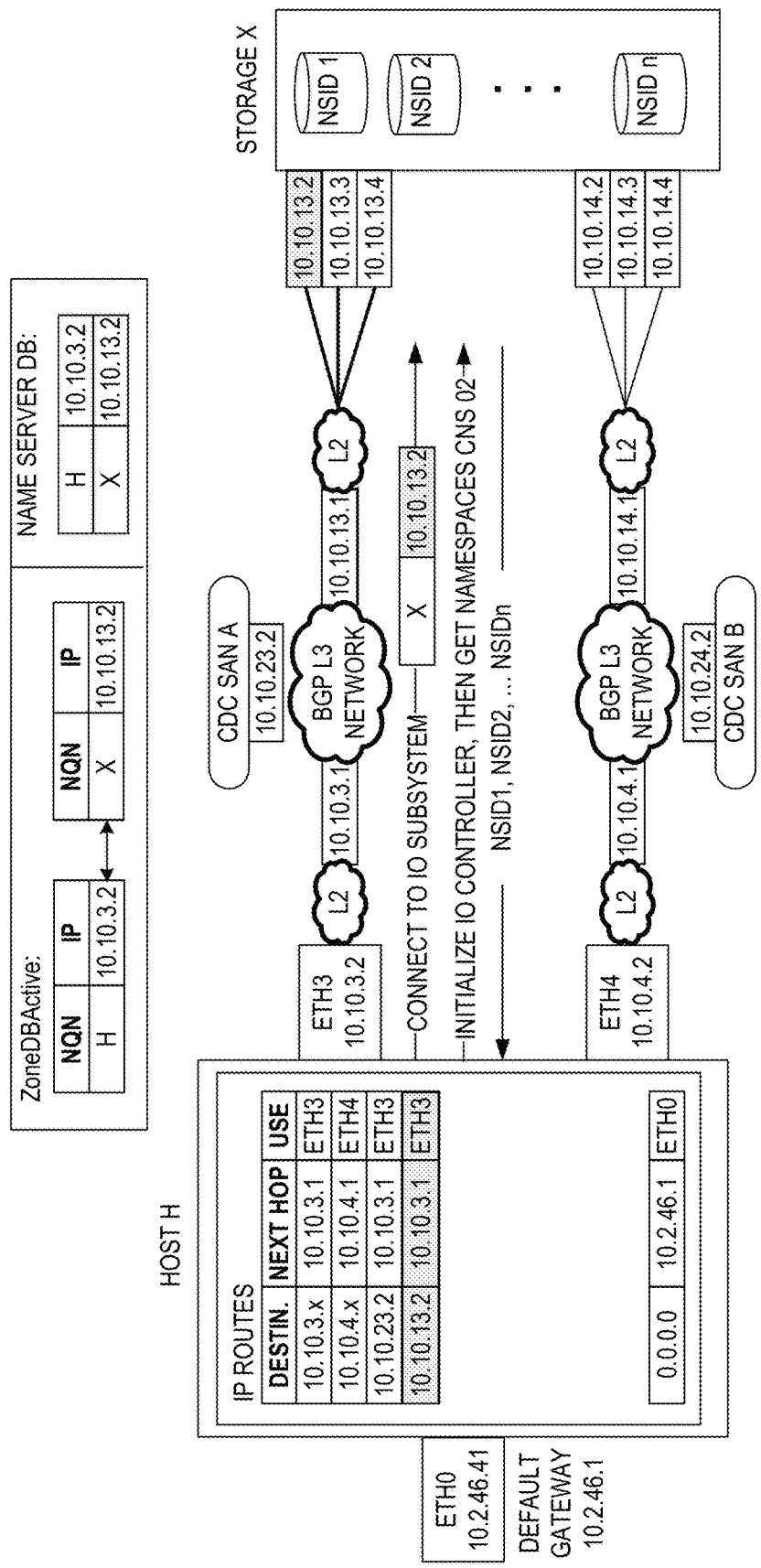
FIG. 9 depicts using network information in an IP routing table to access subsystems in the exemplary NVMe-oF system in FIG. 1, according to embodiments of the present disclosure.

FIG. 9 depicts using network information in an IP routing table to access subsystems in the exemplary NVMe-oF system in FIG. 1, according to embodiments of the present disclosure. In particular, FIG. 9 depicts how, in one or more embodiments, Host H may connect to the subsystem identified by IP address 10.10.13.2, and obtain controller namespaces denoted in FIG. 9 as NSID1, NSID2, . . . NSIDn. It is noted that the controller namespaces should be made available to the host operating system (not shown).

A person of skill in the art will appreciate that Host H and CDC SAN A may undergo a similar process to facilitate connectivity between Host H and I/O subsystem 10.10.13.3 and 10.10.13.4.

Figure 10:
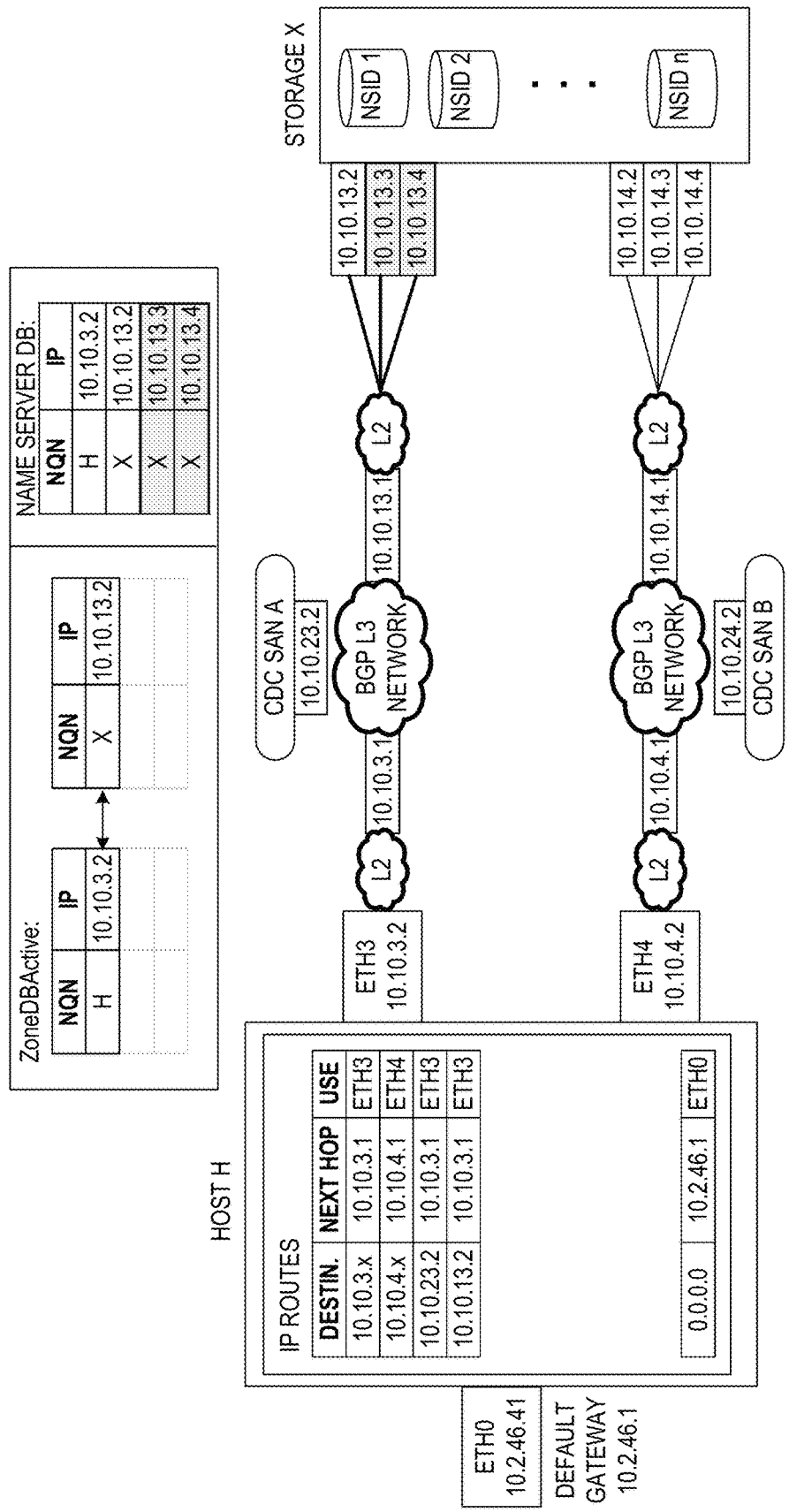
FIG. 10 depicts how storage interfaces may register with a name server database, according to embodiments of the present disclosure.
Figure 11:
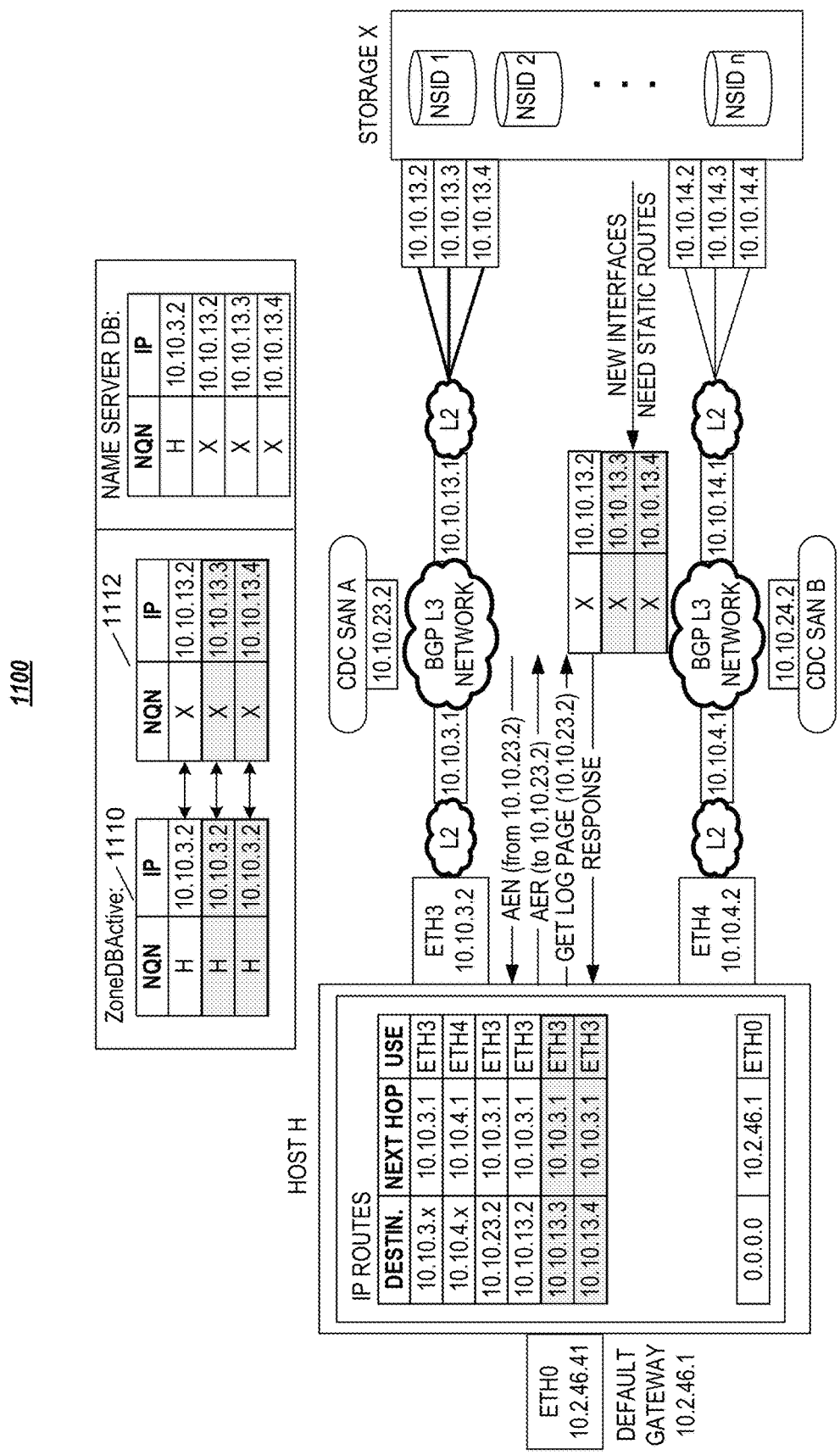
FIG. 11 depicts using network information for updating a host routing table, according to embodiments of the present disclosure.

FIG. 10 depicts how Storage X interfaces 10.10.13.3 and 10.10.13.4 register with the Name Server DB, according to embodiments of the present disclosure, and FIG. 11 depicts how Host H may use network information to update its routing table, according to embodiments of the present disclosure. FIG. 11 further depicts updating CDC SAN A's Zoning database to accommodate a zoning update as indicated by label ZoneDBActive. In one or more embodiments, once a zone group, e.g., a zone group that is defined by one or more entries in tables 1110 and 1112 or by any other information about entities that have permission to communicate with each another over certain interfaces, CDC SAN A may generate one or more notifications, e.g., an Asynchronous Event Notification (AEN).

In one or more embodiments, Host H may respond to the notification(s), e.g., with another request for discovery log entries, to which CDC SAN A may then respond with information about the three subsystems 10.10.13.2 through 10.10.13.4 on Storage X, such as interface IP address 10.10.13.2 and the two newer interface IP addresses 10.10.13.3 and 10.10.13.4 that may be made available to Host H for inclusion into its routing table.

Figure 12:
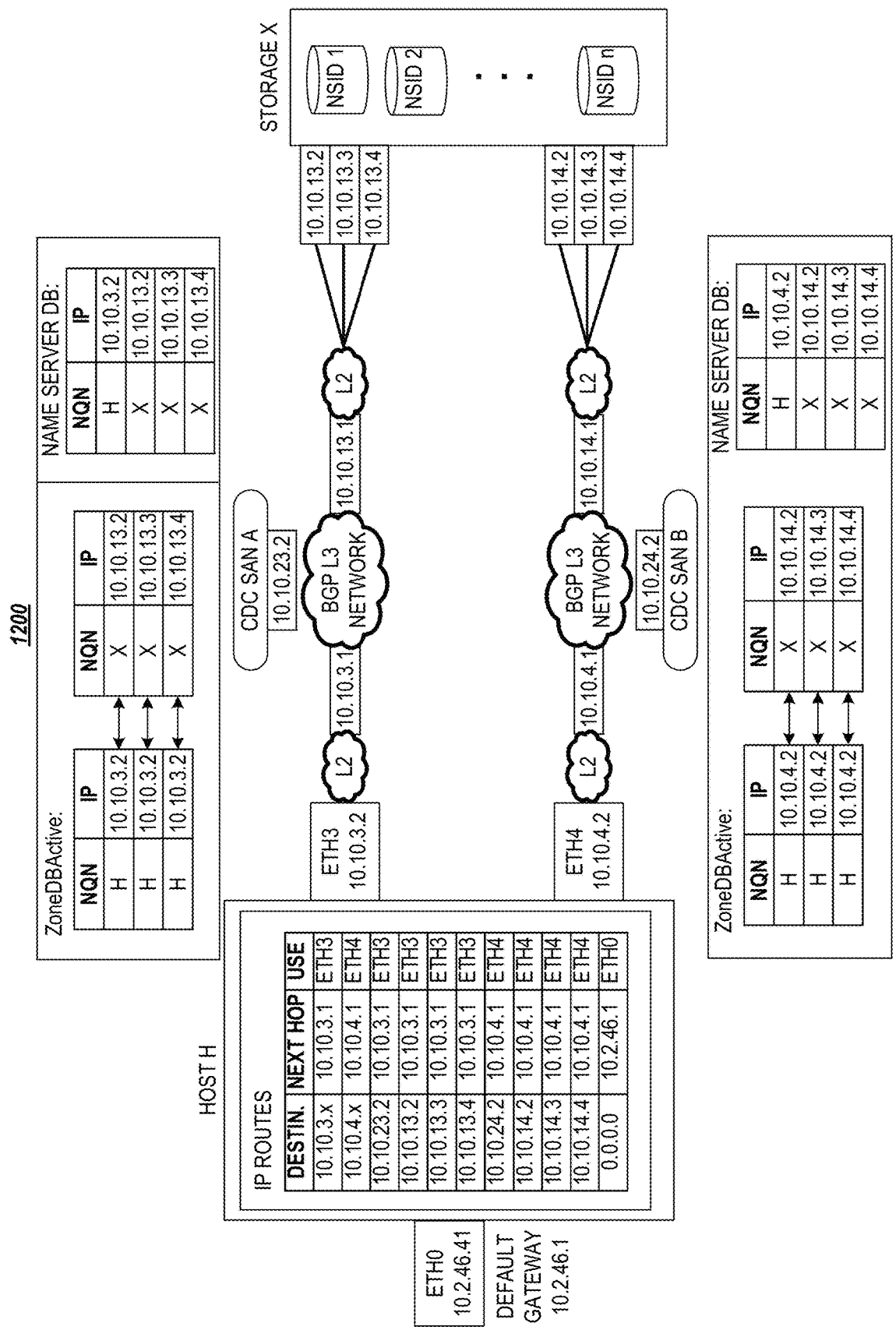
FIG. 12 depicts the exemplary NVMe-oF system in FIG. 1 with fully built routes that have been dynamically configured, according to embodiments of the present disclosure.

A person of skill in the art will appreciate that some or all of the previous steps may be repeated for each interface that NVMe-oF will be supported on, such as interfaces 10.10.4.2 and 10.10.14.2-10.10.14.4, e.g., to result in the exemplary NVMe-oF system depicted in FIG. 12, which illustrates an exemplary set of fully built routes that have been dynamically configured, according to embodiments of the present disclosure.

A person of skill in the art will further appreciate that entities in NVMe-oF system may utilize software to parse commands to extract sought after information.

In one or more embodiments, stale routes may be removed. In general, routing table entries may be made, updated, and removed dynamically, to configure and manage routes, e.g., host routes, to send NMVe-oF traffic on predetermined interfaces, thereby, preventing NVMe-oF traffic from being sent out of an interface connected to the default gateway, e.g., on a LAN. Typically, as long as there is a chance of traffic (e.g., keep-alive messages, I/O) being sent to an NVMe-oF subsystem interface or a Discovery Controller, e.g., a CDC or a direct discovery controller, the static routes should remain in place. Stated differently, routes should remain in place as long as a transport connection to a Discovery Controller or I/O controller remains established.

In one or more embodiments, routes to a controller may be removed, e.g., by a route removal process that may comprise performing one or more of (1) deleting namespaces, (2) tearing down the transport connection, and (3) removing a static route.

In one or more embodiments, routes may be removed in response to one or more of the following exemplary events or conditions: (1) a fatal transport error has been detected and a transport connection cannot be re-established (e.g., after num_retries); (2) a keep-alive timeout between a host and a controller; (3) receiving a Get Log Page response that no longer includes the IP Address of a controller that was previously included in a response; (4) a user issuing a NVMe-CLI command (e.g., nvme disconnect{,-all}); and (5) the ioctl of /sys/class/nvme/. . . /disk/../namespace/delete has been called and all namespaces behind a controller have been deleted.

Various embodiments discussed above rely on modifying or updating entries in an IP routing table, in anticipation of the Host checking the routing table in the process of routing to find matching entries for an IP address, e.g., to enable all entities that use the routing table to communicate with the CDC, e.g., for facilitate trouble shooting other useful function. However, when IP routes are modified in this manner, it oftentimes creates a risk that entries that have been inadvertently removed negatively impact a user's ability to connect to the host and communicate with it. As previously mentioned, solutions that require the involvement of an administrator who manually configures static routes in Host H's IP routing table each time a configuration changes are cumbersome and inefficient.

Other approaches, such as source routing, which uses a routing table for per-interface routing that identifies specific routes that should be taken from a source IP address to a destination IP address, are not easy to automate without adding several layers of complexity. One approach that attempts to overcome IP routing problems in IP SANs involves the use of network namespace to isolate each network entrance into its own network namespace and use a routing table for each network namespace. However, this approach suffers from similar problems associated with removing entries from a routing table.

Therefore, it is desirable to have systems and methods that establish an explicit persistent connection between a host and a CDC over which specific commands can be routed as needed, thereby, eliminating the need for routing table lookups and updates. Various embodiments, therefore, do not rely on IP route tables to establish and maintain connectivity in IP SANs.

B. Embodiments Not Requiring IP Route Updates

Figure 13:
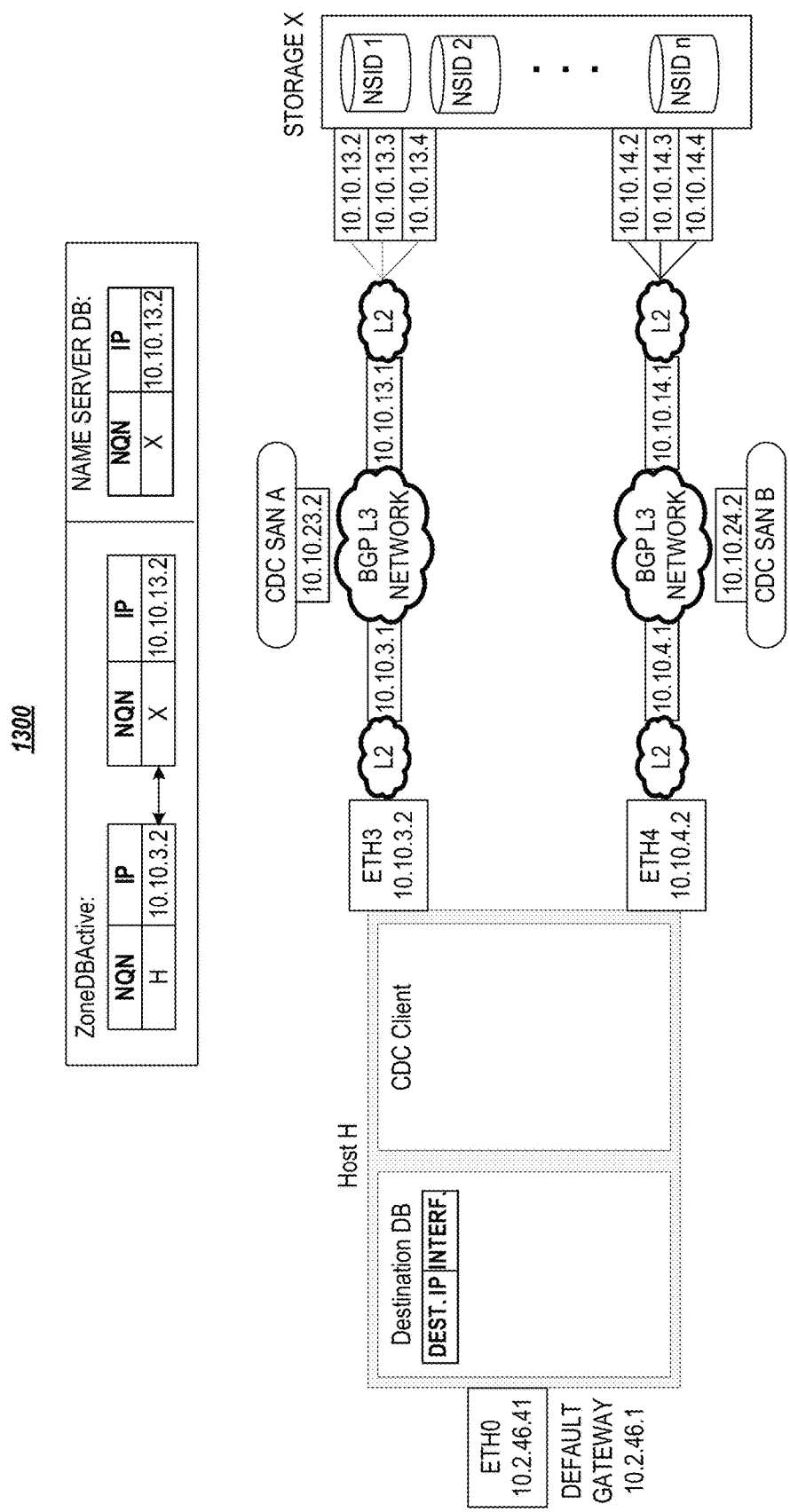
FIG. 13 depicts an exemplary NVMe-oF system, according to embodiments of the present disclosure.

FIG. 13 depicts an exemplary NVMe-oF system, according to embodiments of the present disclosure. For clarity, components similar to those shown in FIG. 1-FIG. 12 are labeled in the same manner. For purposes of brevity, a description or their function is not repeated here. Unlike the host described in FIGS. 1-12, Host H shown in FIG. 13 does not use an IP routing table to establish connectivity. Instead, in one or more embodiments, a CDC Client and a destination database may be used to configure Host H to communicate with specific IP addresses. As discussed in greater detail below, the destination database may be used to maintain information of discovered entities that may be used by the CDC client to associate network entities or subsystems with specific network interfaces. The CDC client may be implemented as an open-source CDC client that operates, e.g., on a Linux operating system.

FIG. 14 depicts a flowchart of an exemplary process for dynamically managing connections in an NVMe-oF system, according to embodiments of the present disclosure. In one or more embodiments, process 1400 may begin when, for the NVMe-oF system that may comprise first and second networks or sub-networks, such as the host and storage networks in FIG. 13, a connection is established (1405) between a host associated with the first network and a discovery controller associated with a second network. The host may comprise a host network interface having a host network interface address and may further comprise a destination database that may be used to store destination IP addresses and network information.

In one or more embodiments, the host may receive (1410), via the host network interface, network information from the discovery controller that identifies the discovery controller. The host may use the network information to connect (1415) to the discovery controller by using the host network interface address in a transport interface parameter to establish a persistent explicit network connection between the CDC client and the CDC.

The host may receive (1420), at the host network interface, a destination IP address associated with a subsystem having a subsystem interface. The host may then connect (1425) to the subsystem interface to facilitate a connection to the storage device by using the transport interface parameter to specify that the host network interface be used for connecting the CDC client with the subsystem interface.

Figure 15:
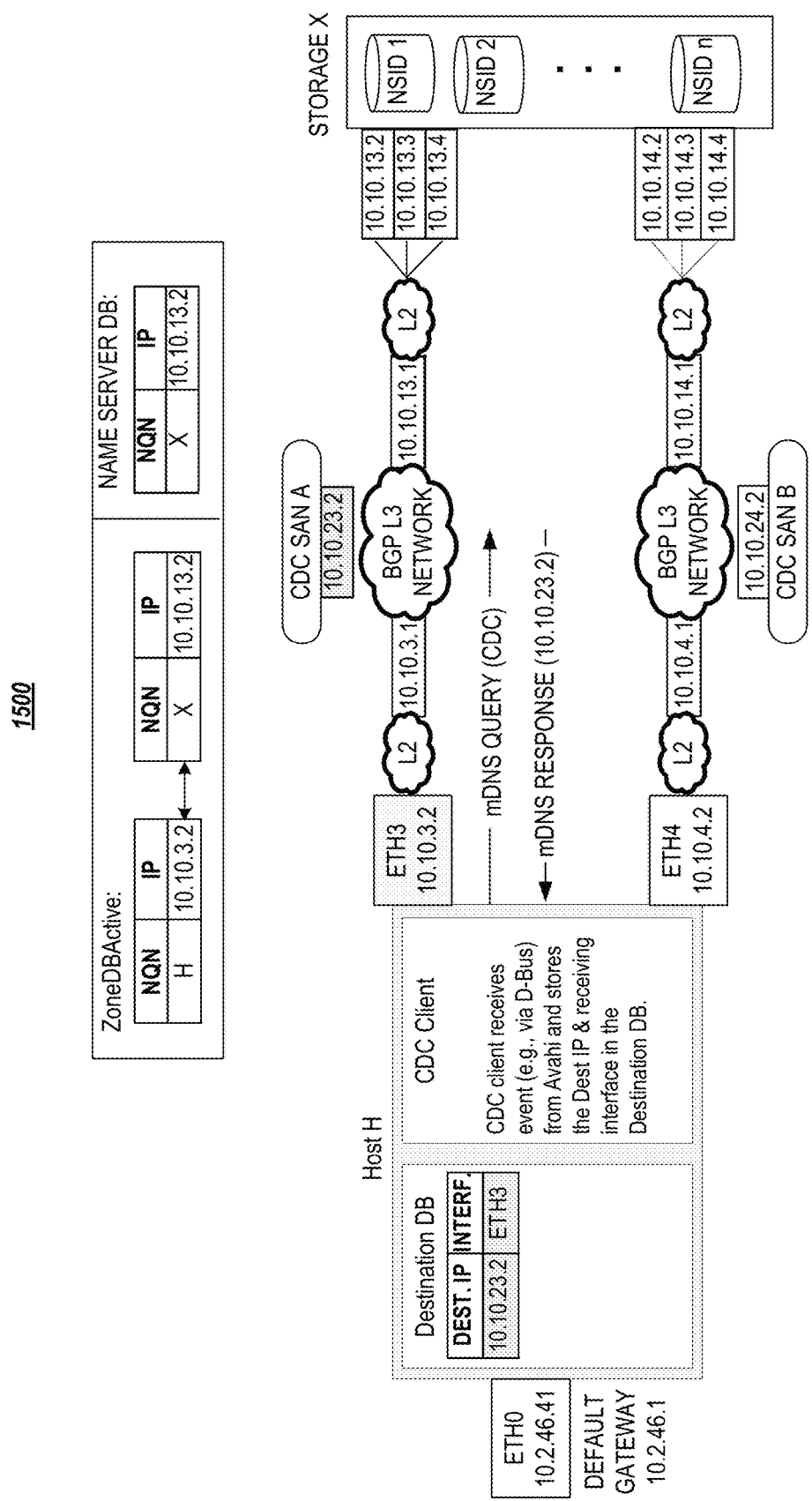
FIG. 15 depicts the use of an mDNS query to configure a destination database in the exemplary NVMe-oF system in FIG. 13, according to embodiments of the present disclosure.

FIG. 15 depicts the use of an mDNS query to configure a destination database in the exemplary NVMe-oF system in FIG. 13, according to embodiments of the present disclosure. Similar to FIG. 3, ZoneDBActive may comprise an entry that allows Host H to access interface 10.10.13.2 at Storage X; and Name Server DB comprises an entry that indicates that interface 10.10.13.2 is connected to Storage X.

In one or more embodiments, the CDC client sends, via interfaces eth3 and eth4, an mDNS query or similar message on a multicast address that asks entities such as CDC SAN A that support a NVMe™ discovery service, such as the _nvme-disc or similar service, to identify itself. A response, by such an entity, e.g., in the form of a multicast message, may comprise mDNS information, such as an IP address (here 10.10.23.2), and a specific network interface, (here eth3) that should be used to set an NVMe-CLI parameter to bind a connection to that network interface. As shown in FIG. 15, some of all of the mDNS information may be stored in the destination database, which may be located within Host H.

Taking advantage of mDNS information regarding which interface(s) should be used to set an NVMe-CLI parameter to bind a connection to a specific network interface in this manner has as the further benefit that if a desired network interface becomes inoperable, traffic is not negatively impacted. For example, unlike when using entries in a routing table, there is no need to modify the routing table to remove entries associated with a faulty connection. Further, when attempting to communicate with a storage array, the operating system, after finding no proper route, in embodiments herein does not default back to a route through an interface at the default gateway, i.e., a problem sought to be avoided in the first place. Instead, since a socket option may specify an interface on the Host H, Host H does not even need to attempt communicating via a path not intended for communication.

Figure 25:
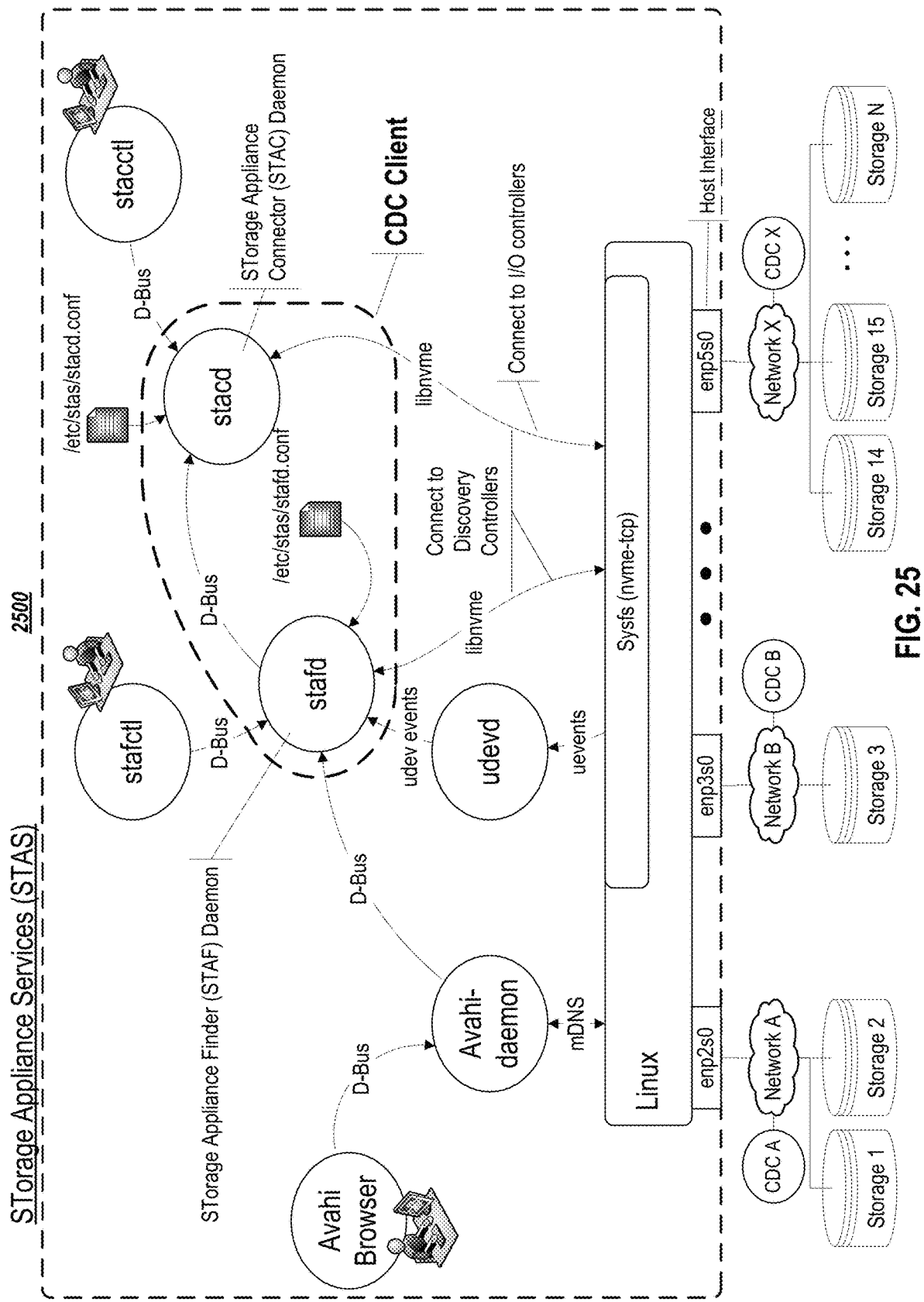
FIG. 25 depicts an exemplary CDC client implementation of STorage Appliance Services (STAS) according to embodiments of the present disclosure.

In one or more embodiments, the CDC client may use, e.g., an open-source software package has an mDNS client such as the Avahi daemon to discover services and/or CDCs using mDNS. As depicted in FIG. 25, which illustrates an exemplary CDC client implementation of STAS according to embodiments of the present disclosure, the CDC client may receive the information, e.g., via an API such as Desktop Bus (D-Bus) that allows processes to talk to each other. In one or more embodiments, STAS may be implemented using a storage appliance connector daemon (stacd) and a device storage appliance finder daemon (stafd) operating on a host computer.

Figure 16:
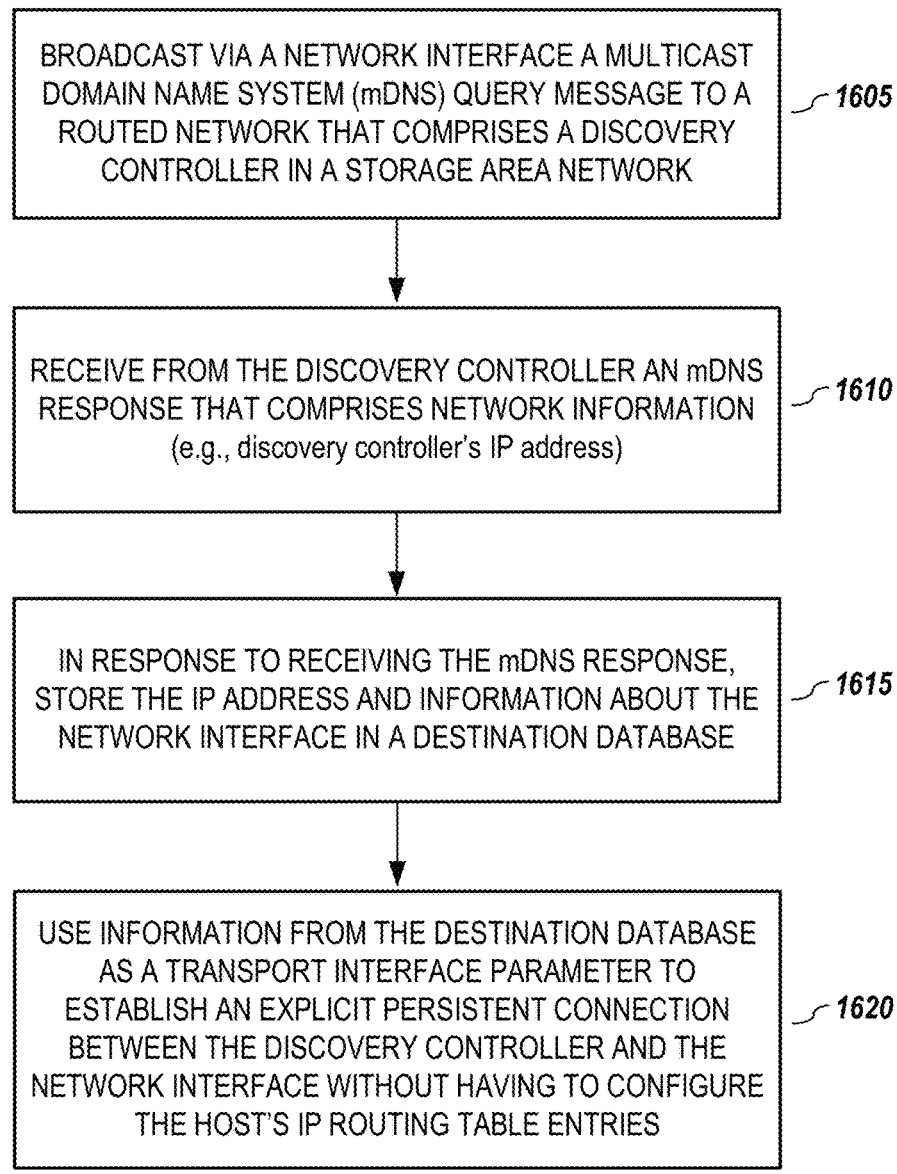
FIG. 16 depicts a flowchart of an exemplary process for using an mDNS query to configure a destination database, according to embodiments of the present disclosure.

FIG. 16 depicts a flowchart of an exemplary process for using an mDNS query to configure a destination database, according to embodiments of the present disclosure. In one or more embodiments, process 1600 may begin when a CDC client that may be implemented in a host broadcasts (1605), e.g., at one of its interfaces, a query message, such as an mDNS query, to a routed network that comprises a discovery controller associated with a SAN. In response to the mDNS query, the CDC client may receive (1610) from the discovery controller an mDNS response that comprises network information. This response may comprise self-identifying information about the discovery controller, such as the discovery controller's IP address that the CDC client may use to communicate with discovery controller. Upon receipt of the mDNS response, the host may store (1615) the IP address and information about the network interface on which the mDNS response was received in a destination database. In one or more embodiments, at least some of the information stored in the destination database may be then used (1620) as a transport interface parameter to specify that a given command should egress from that network interface or that the network interface should be used to establish a connection to the discovery controller.

The IP address and the network interface information may, thus, be used to establish an explicit persistent connection between the discovery controller and the interface on which the CDC client broadcast the query message, thus, enabling the host to reliably and repeatedly communicate with the discovery controller via that interface and without having to configure or update routes in the host's IP routing table. Once a device or a service has been discovered using mDNS, a controller initialization process may be used to create the explicit persistent connection to the discovery controller.

Figure 17:
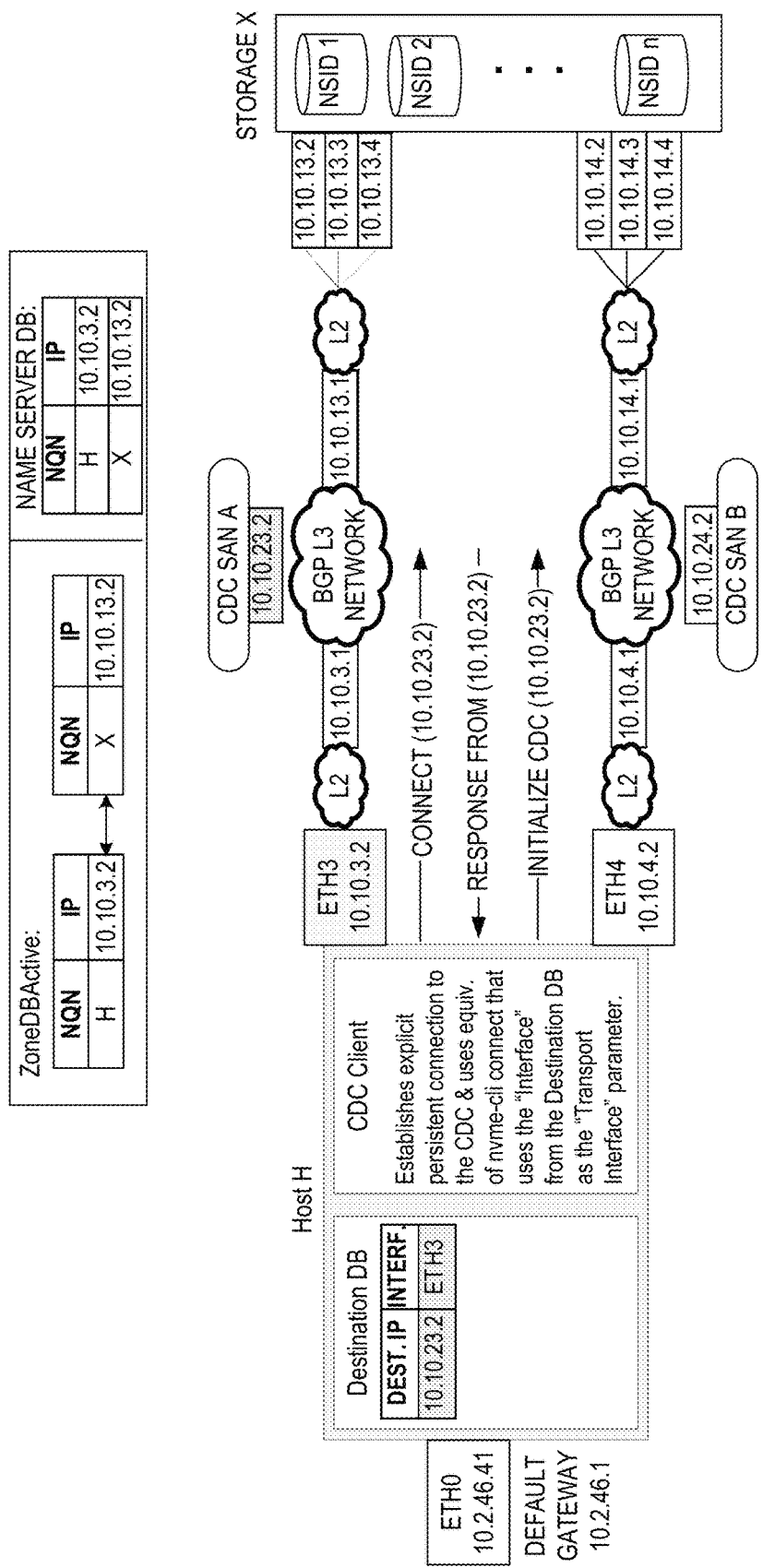
FIG. 17 depicts connecting and initializing a discovery controller, according to embodiments of the present disclosure.

FIG. 17 depicts connecting and initializing a discovery controller, according to embodiments of the present disclosure. As a result of the CDC client discovering the IP address and network interface at which the mDNS response has been received, Host H has discovered, via mDNS, the interface on which CDC SAN A is located. The CDC client may, thus, use the discovered information, i.e., the destination IP address (10.10.23.2) and the interface (eth3) on which it was received to create an entry in Host H's destination database to enable Host H to send out frames to CDC SAN A via interface eth3.

In one or more embodiments, Host H may use the discovered information to establish an explicit persistent connection to CDC SAN A by using a connect command, e.g., the equivalent of an NVMe-CLI command, using the interface information in the destination database as a tri-face, which may be added to an NVMe™ connect command, e.g., as an NVMe-CLI parameter.

In one or more embodiments, the tri-face parameter allows to specify a network interface that a given command should egress from. For example, when a socket is created in a Linux kernel, one of the socket options, SO_BIND-TODEVICE, may be used to specify a network interface on the socket that should be used for a certain connection. In the example in FIG. 17, since the response was received on network interface eth3, that interface is used to establish a socket connection, thereby, explicitly binding the connection, creating a socket to a specific interface on Host H. It is noted that, in one or more embodiments, prior to CDC SAN A sending out a response to a connection request by Host H, CDC SAN A may use some of all information in that connection request to update its name server database, e.g., by adding the NQN and the IP address of the network interface (10.10.3.2) to its name server database. The connection request may be used to implicitly register Host H with the CDC SAN A's IP address.

Figure 18:
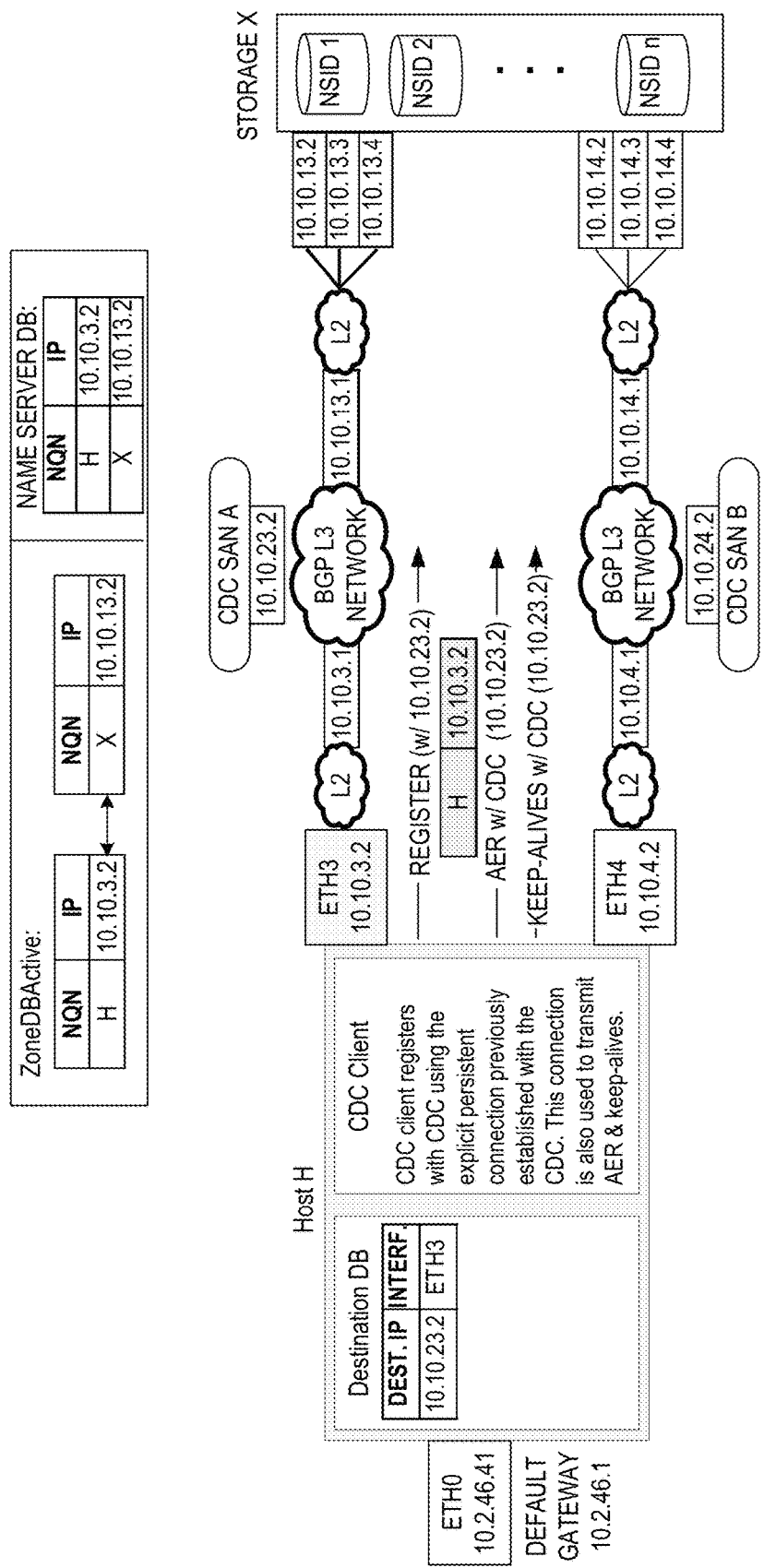
FIG. 18 depicts registering with a discovery controller, according to embodiments of the present disclosure.

Once a persistent explicit connection between the network interface and the CDC has been successfully established, e.g., by setting a socket option that specifies the network interface eth3, the connection may be used for any type of traffic, as indicated in FIG. 18, e.g., to register Host H with CDC SAN A and to communicate AERs, AENs, and keep-alive commands, or to initialize IP controllers, obtain name spaces, and the like to facilitate proper operation in the NVMe-oF environment. A person of skill in the art will appreciate that similar considerations apply to CDC SAN B and its CDC client and destination database, which for sake of simplicity is not shown herein.

Figure 19:
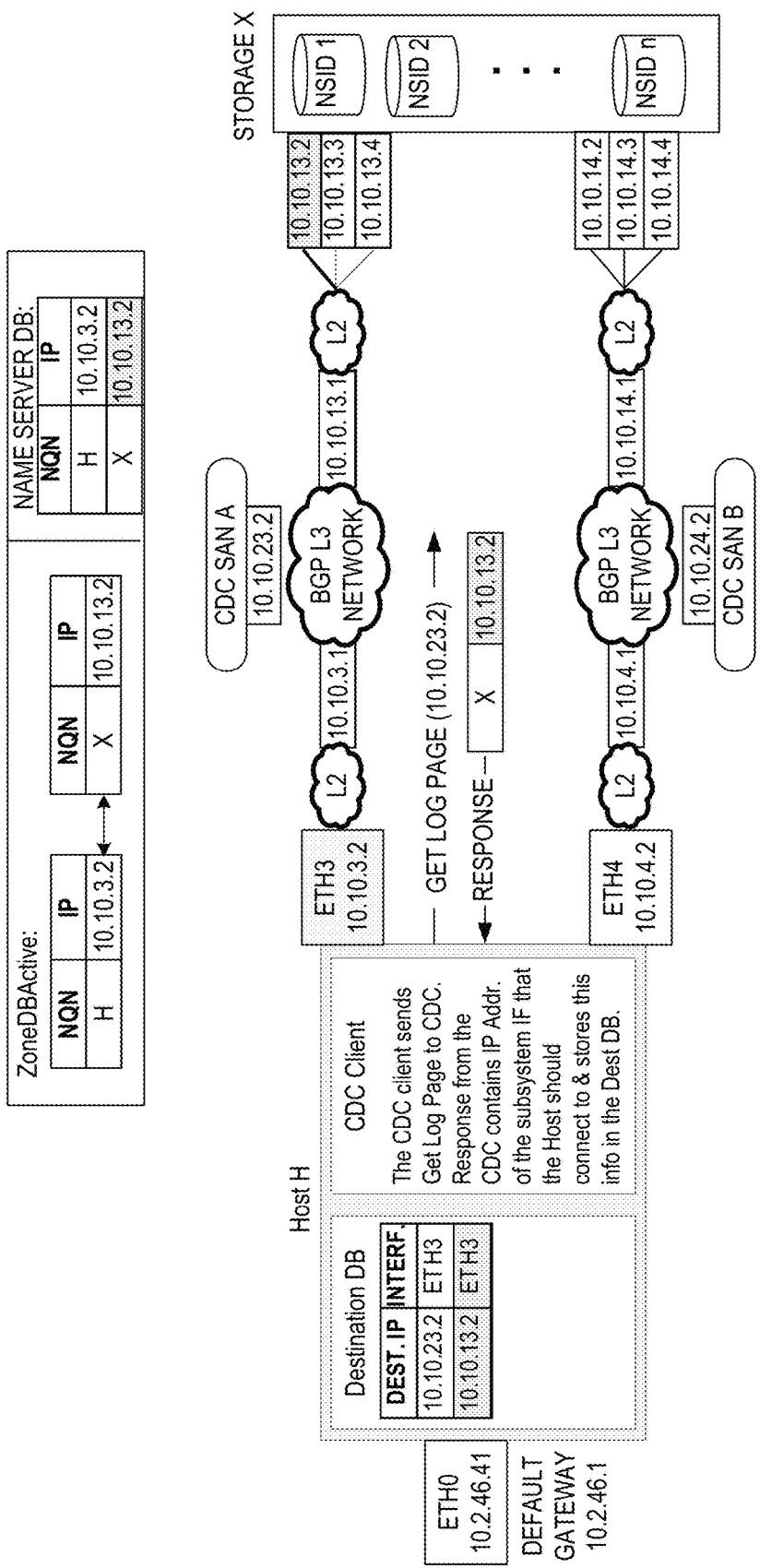
FIG. 19 depicts obtaining network information for configuring a destination database, according to embodiments of the present disclosure.

FIG. 19 depicts obtaining network information for configuring a destination database, according to embodiments of the present disclosure. Similar to FIG. 7 and FIG. 17, in one or more embodiments, once CDC SAN A is set up and has been initialized, Host H may discover entities that expose storage targets, e.g., port 10.10.13.2 on Storage X that Host H is coupled to via SAN A. In one or more embodiments, Host H may use the CDC client to communicate an NVMe-oF Get Log Page command to CDC SAN A to obtain a response that comprises one or more discovery log entries, including the IP address of subsystem interfaces, such as 10.10.13.2 that Host H should connect to. Host H may store the information from the Get Log Page response in its destination database along with the interface at which the response was received, indicating that the subsystem interface can be accesses over the host interface eth3.

Figure 20:
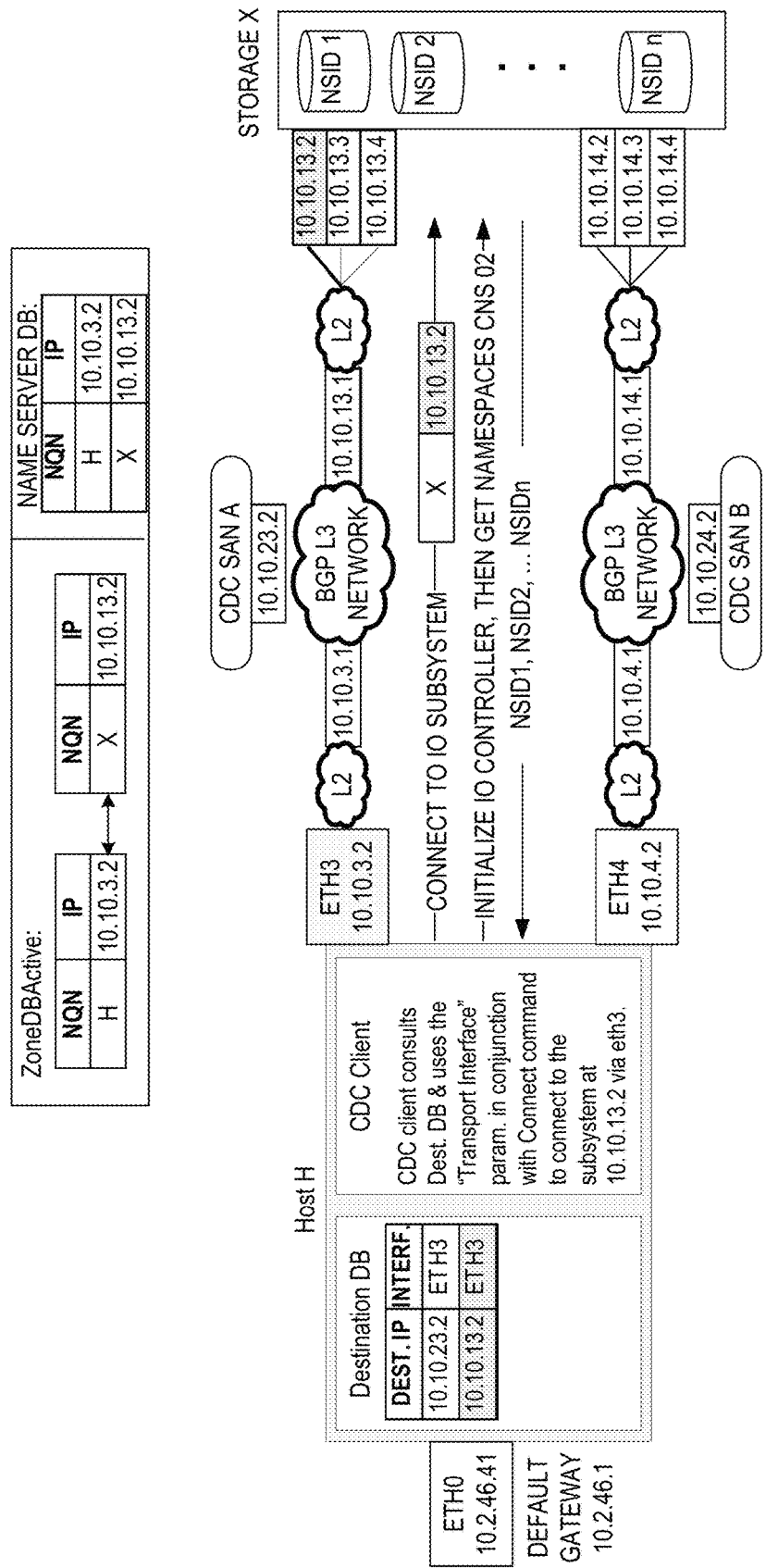
FIG. 20 depicts using network information in a destination database to access subsystems in the exemplary NVMe-oF system in FIG. 13, according to embodiments of the present disclosure.

FIG. 20 depicts using network information in a destination database to access subsystems in the exemplary NVMe-oF system in FIG. 13, according to embodiments of the present disclosure. In one or more embodiments, Host H may establish a persistent explicit connection to a subsystem by using the information that has been obtained in the Get Log Page response (here subsystem IP address 10.10.13.2) and stored in destination database to issue a connect command to the subsystem. In one or more embodiments, the connect command may use the interface information as a tri-face parameter that calls SO_BINDTODEVICE to specify that host interface address 10.10.3.2 (eth3) be used for frames destined for that IP address.

Figure 21:
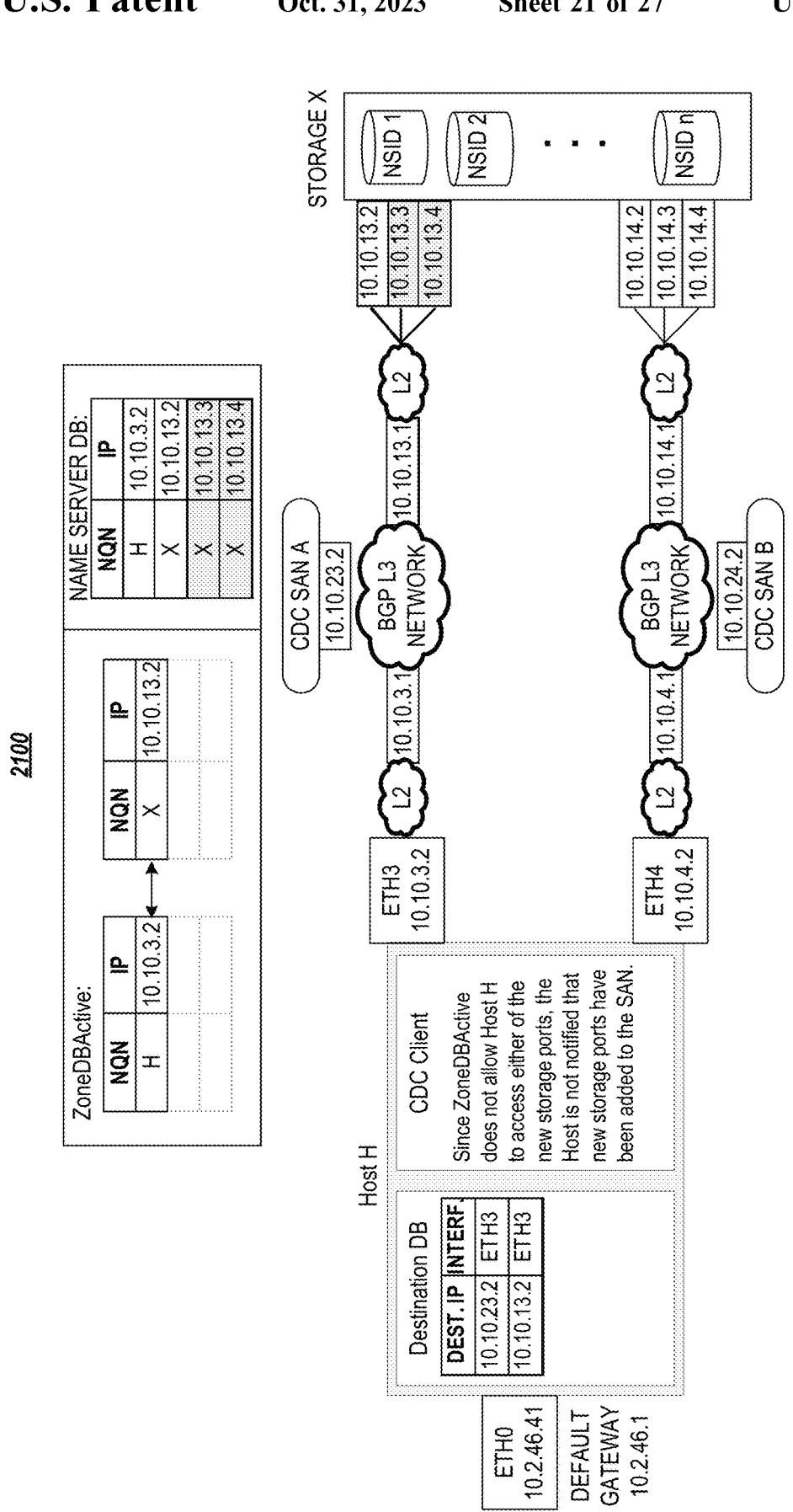
FIG. 21 depicts how storage interfaces may register with a name server database, according to embodiments of the present disclosure.
Figure 22:
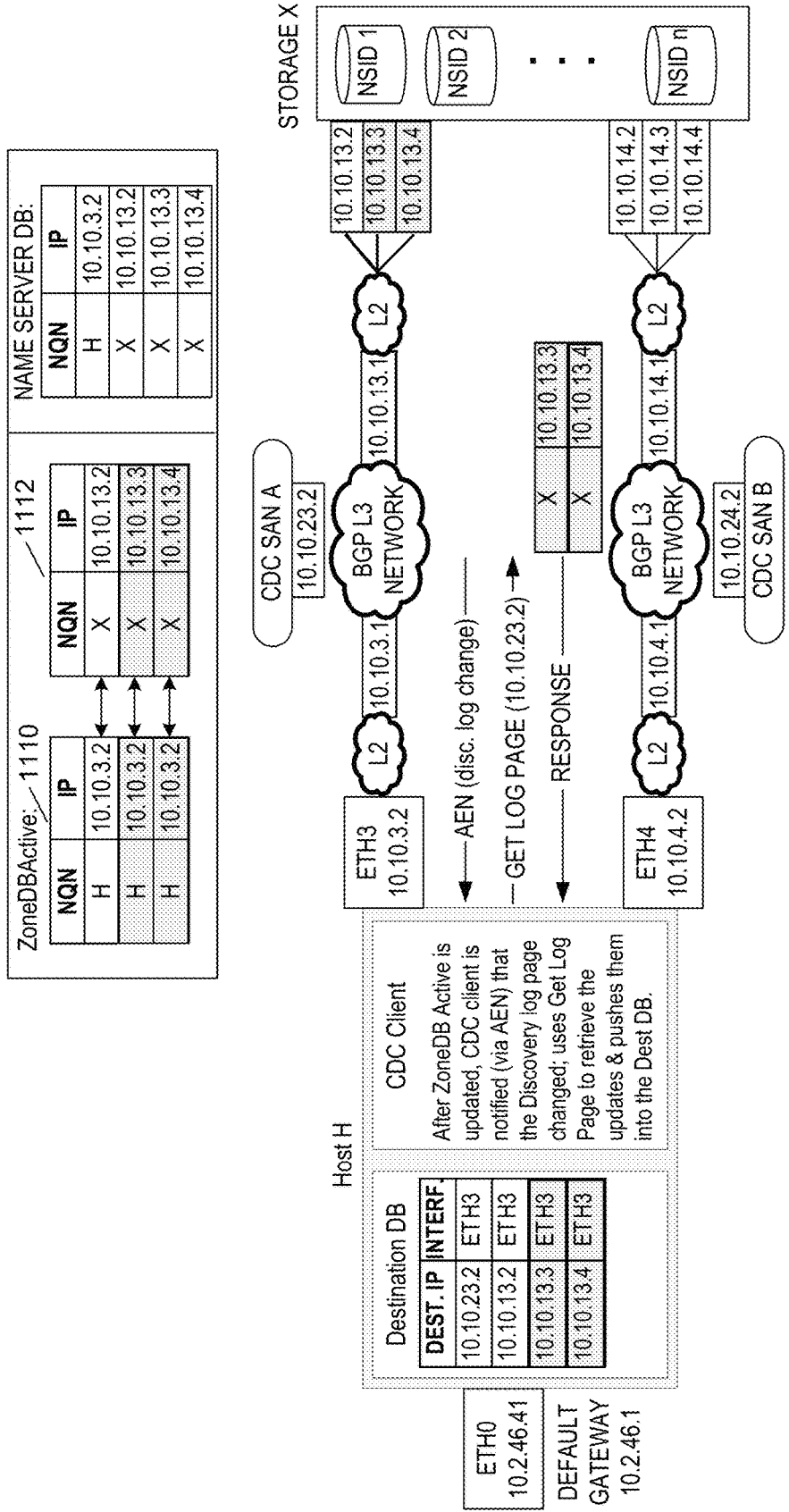
FIG. 22 depicts using network information for updating a destination database, according to embodiments of the present disclosure.

FIG. 21 depicts how storage interfaces may register with a name server database, according to embodiments of the present disclosure. Once new storage ports added to the SAN (here, 10.10.13.3 and 10.10.13.4) but ZoneDBActive is not yet updated, ZoneDBActive does not allow Host H to access the new interfaces to communicate with the storage ports, and Host H is not notified of the changes. As depicted in FIG. 22, in one or more embodiments, once zones are added to allow communication with those interfaces, the CDC SAN A notifies the CDC client, e.g., via AEN, that a discovery log page has changed. The CDC client may then use a Get Log Page command to retrieve from the CDC the change in the network information regarding two new interfaces. In response to receiving discovery log page entries 10.10.13.4 and 10.10.13.4, the CDC client may use that information to update the destination database to reflect the change and to accommodate a zoning update.

Figure 23:
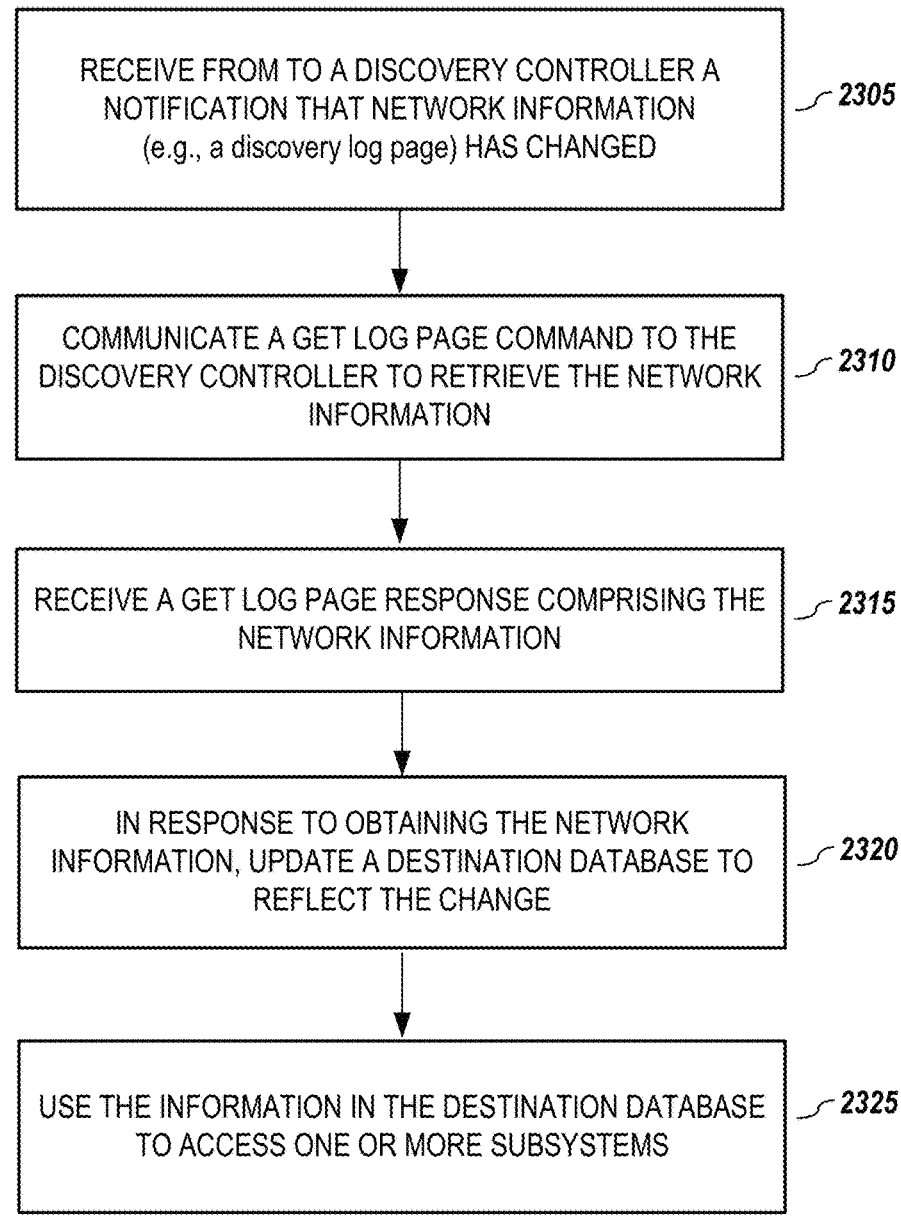
FIG. 23 depicts a flowchart of an exemplary process for obtaining network information for configuring a destination database, according to embodiments of the present disclosure.

FIG. 23 depicts a flowchart of an exemplary process for obtaining network information for configuring a destination database, according to embodiments of the present disclosure. In one or more embodiments, process 2300 may begin when a host, such as a host in an NVME-oF environment, receives (2305) from to a discovery controller a notification that network information, e.g., a discovery log page associated with one or more subsystems in an NVMe-oF environment, has changed. In response to the notification, the host may communicate (2310) an NVMe-oF Get Log Page command to the discovery controller to retrieve the network information. The host may receive (2310) a Get Log Page response that comprises the change in the network information. In one or more embodiments, in response to obtaining the network information about the one or more subsystems, such as an IP address associated with a subsystem, the host may update (2320) its destination database, e.g., to enable the host to access (2325) at least some of the one or more subsystems.

Figure 24:
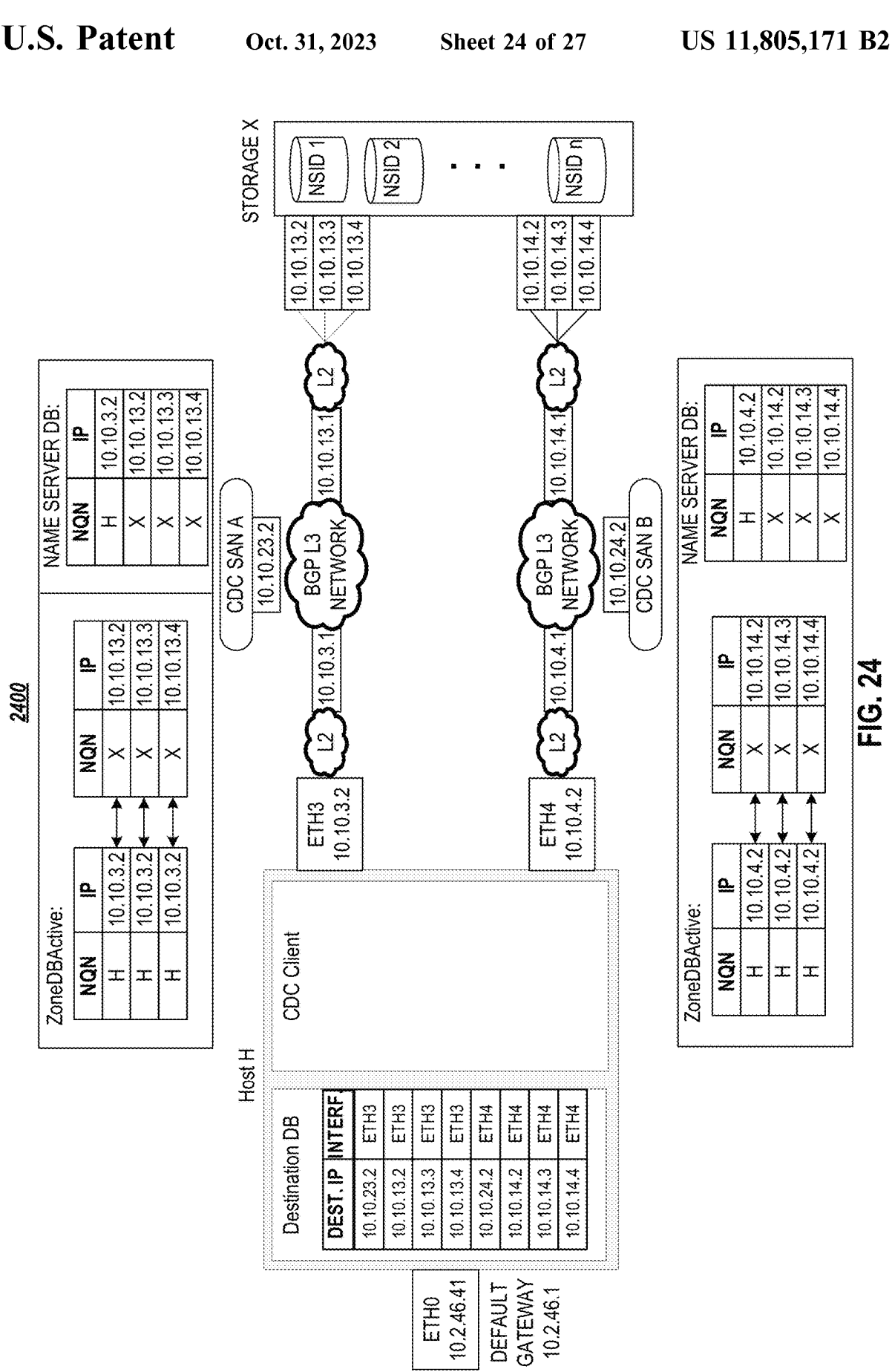
FIG. 24 depicts the exemplary NVMe-oF system in FIG. 13 with fully built routes that have been dynamically configured according to embodiments of the present disclosure.

FIG. 24 depicts the exemplary NVMe-oF system in FIG. 13 with fully built routes that have been dynamically configured, and FIG. 25 depicts an exemplary CDC client implementation of STAS, according to embodiments of the present disclosure. Sub-networks A, B, and X in FIG. 25 identify themselves to the Avahi daemon. In one or more embodiments, the Avahi daemon may communicate to the Linux system that it found a new stafd, and upon the Avahi daemon determining pre presence of a CDC to connect to, it may set up a connection to that CDC, e.g., to retrieve discovery log pages. The Avahi daemon may use mDNS and DNS-SD to discover services and CDCs and maintain a cache of the discovered services.

In one or more embodiments, stafd may connect to CDCs to retrieve and cache the discovered log pages and a list of the CDCs that have been discovered by the Avahi daemon. This information may be made available to other processes. For example, stacd, which connects to storage devices and I/O Controllers (IOCs), may use the discovery log pages to set the IOC connection to the storage devices. In one or more embodiments, the stafd daemon may connect to the Avahi daemon and, e.g., register for events related to service type _nvme-disc._tcp. This allows stafd to dynamically identify responding CDCs and DDCs.

In one or more embodiments, once a CDC is located, the Avahi daemon may provide to stafd both the CDC's IP address and the interface on which the CDC was located. It is noted that stafd allows users to manually enter CDCs and DDCs in a configuration file (denoted as /etc/stas/stafd.conf in FIG. 25) if, for example, a user opts to not rely on the Avahi daemon to locate CDCs.

In one or more embodiments, stafd retrieves the list of CDCs that stafd may connect to in order to ensure that the SO_BINDTODEVICE socket option is set to the interface previously reported by Avahi. This allows stafd to bypass the routing table and the need to configure new routes to reach CDCs. The stafd daemon may retrieve the list of storage subsystems, e.g., by using the Get Log Page command. Other exemplary tasks performed by the stafd daemon comprise providing a D-Bus interface that allows third party applications to retrieve data about discovery controller connections and discovered storage subsystems.

In one or more embodiments, stacd may be used to retrieve, e.g., over a D-Bus, a list of discovered storage subsystems that were collected by stafd. A list of storage subsystems to connect to may also be read from the configuration file /etc/stas/stacd.conf. In one or more embodiments, the stacd daemon may dynamically set up I/O connections and connect to storage subsystems' IOCs, e.g., to verify that the SO_BINDTODEVICE socket option is set to the interface that was used to connect to those discovery controllers from which the log pages were retrieved, thereby, bypassing the routing table and eliminating the need to configure new routes to reach the IOCs. Other exemplary tasks that may be performed by the stacd daemon comprise providing a D-Bus interface that allows third party applications to retrieve data about the IOC connections.

In one or more embodiments, utilities such as stafctl and stacctl may be used, e.g., to allow users to interact with the stafd daemon and the stacd daemon. Such utilities, used by various programs, such as systemctl with systemd, may provide several options to display the current state of stafd and stacd and/or control their behavior. As one example, tracing may be enabled to provide additional debug information in the system log.

C. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices, such as a keyboard, mouse, stylus, touchscreen, and/or video display. The computing system may also include one or more buses operable to transmit communications between the various hardware components.

Figure 26:
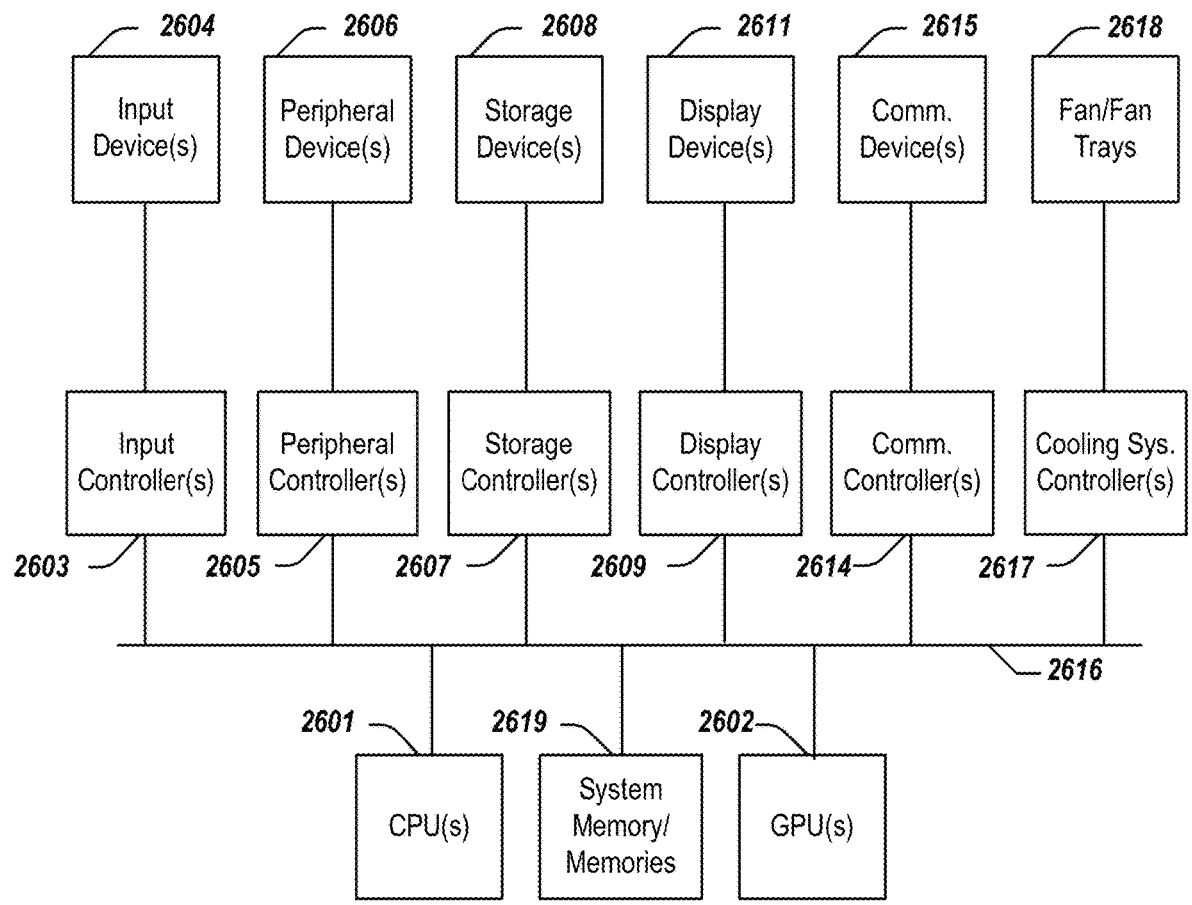
FIG. 26 depicts a simplified block diagram of an information handling system, according to embodiments of the present disclosure.

FIG. 26 depicts a simplified block diagram of an information handling system (or computing system), according to embodiments of the present disclosure. It will be understood that the functionalities shown for system 2600 may operate to support various embodiments of a computing system—although it shall be understood that a computing system may be differently configured and include different components, including having fewer or more components as depicted in FIG. 26.

As illustrated in FIG. 26, the computing system 2600 includes one or more central processing units (CPU) 2601 that provides computing resources and controls the computer. CPU 2601 may be implemented with a microprocessor or the like and may also include one or more graphics processing units (GPU) 2602 and/or a floating-point coprocessor for mathematical computations. In one or more embodiments, one or more GPUs 2602 may be incorporated within the display controller 2609, such as part of a graphics card or cards. The system 2600 may also include a system memory 2619, which may comprise RAM, ROM, or both.

A number of controllers and peripheral devices may also be provided, as shown in FIG. 26. An input controller 2603 represents an interface to various input device(s) 2604, such as a keyboard, mouse, touchscreen, and/or stylus. The computing system 2600 may also include a storage controller 2607 for interfacing with one or more storage devices 2608 each of which includes a storage medium such as magnetic tape or disk, or an optical medium that might be used to record programs of instructions for operating systems, utilities, and applications, which may include embodiments of programs that implement various aspects of the present disclosure. Storage device(s) 2608 may also be used to store processed data or data to be processed in accordance with the disclosure. The system 2600 may also include a display controller 2609 for providing an interface to a display device 2611, which may be a cathode ray tube (CRT) display, a thin film transistor (TFT) display, organic light-emitting diode, electroluminescent panel, plasma panel, or any other type of display. The computing system 2600 may also include one or more peripheral controllers or interfaces 2605 for one or more peripherals 2606. Examples of peripherals may include one or more printers, scanners, input devices, output devices, sensors, and the like. A communications controller 2614 may interface with one or more communication devices 2615, which enables the system 2600 to connect to remote devices through any of a variety of networks including the Internet, a cloud resource (e.g., an Ethernet cloud, a Fiber Channel over Ethernet (FCoE)/Data Center Bridging (DCB) cloud, etc.), a LAN, a wide area network (WAN), a SAN or through any suitable electromagnetic carrier signals including infrared signals. As shown in the depicted embodiment, the computing system 2600 comprises one or more fans or fan trays 2618 and a cooling subsystem controller or controllers 2617 that monitors thermal temperature(s) of the system 2600 (or components thereof) and operates the fans/fan trays 2618 to help regulate the temperature.

In the illustrated system, all major system components may connect to a bus 2616, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 27:
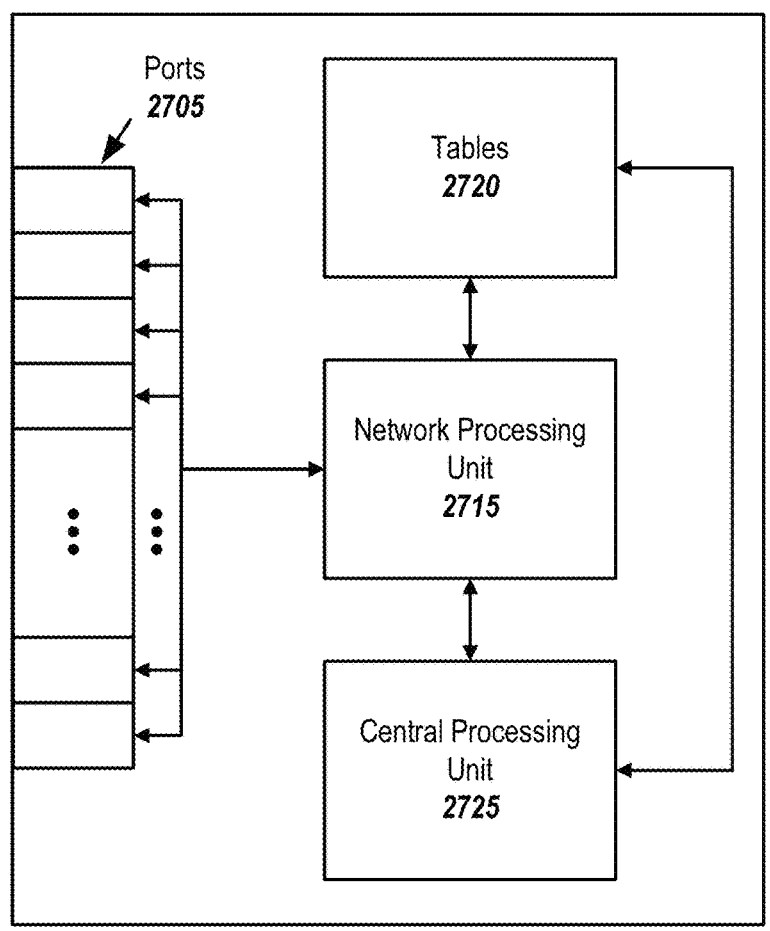
FIG. 27 depicts an alternative block diagram of an information handling system, according to embodiments of the present disclosure.

FIG. 27 depicts an alternative block diagram of an information handling system, according to embodiments of the present disclosure. It will be understood that the functionalities shown for system 2700 may operate to support various embodiments of the present disclosure—although it shall be understood that such system may be differently configured and include different components, additional components, or fewer components.

The information handling system 2700 may include a plurality of I/O ports 2705, a network processing unit (NPU) 2715, one or more tables 2720, and a central processing unit (CPU) 2725. The system includes a power supply (not shown) and may also include other components, which are not shown for sake of simplicity.

In one or more embodiments, the I/O ports 2705 may be connected via one or more cables to one or more other network devices or clients. The network processing unit 2715 may use information included in the network data received at the node 2700, as well as information stored in the tables 2720, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CDs and holographic devices; magneto-optical media; and hardware devices that are specially configured to store or to store and execute program code, such as ASICs, programmable logic devices (PLDs), flash memory devices, other NVM devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for using a centralized discovery controller (CDC) client to dynamically establish network connections in a non-volatile memory express over Fabric (NVMe-oF) system, the method comprising:
in response to a CDC client, which operates on a host, receiving, via a host interface having a host interface address, a discovery controller (DC) internet protocol (IP) address that identifies a DC, storing in a destination database the DC IP address as a destination IP address and storing a host interface name;
using the host interface name in a transport interface parameter to establish a network connection with a CDC via the host interface;
receiving, at the host interface, a destination IP address associated with a subsystem having a subsystem interface; and
using the transport interface parameter to specify that the host interface be used to connect with the subsystem interface to establish a connection with the subsystem.

2. The computer-implemented method of claim 1, wherein:
using the host interface name in the transport interface parameter causes the host to bypass a host routing table, if any, in forming the network connection;
using the transport interface parameter to specify that the host interface be used to connect with the subsystem interface causes the host to bypass a host routing table, if any, in establishing the connection with the subsystem; or
both.

3. The computer-implemented method of claim 1, wherein the CDC client receives the DC IP address or the destination IP address associated with a subsystem in a response.

4. The computer-implemented method of claim 1, wherein the CDC client performs steps comprising at least one of:
initializing the discovery controller;
registering a host with the discovery controller;
requesting asynchronous event notification messages; and
transmitting a keep-alive command to the discovery controller.

5. The computer-implemented method of claim 1, further comprising retrieving from a configuration file a second discovery controller IP address and a second interface at which the second discovery controller IP address was received.

6. The computer-implemented method of claim 1, wherein the discovery controller comprises, in a name server database, NVMe™ Qualified Names (NQNs) for the host interface and the subsystem interface.

7. The computer-implemented method of claim 6, wherein the NQNs are used in one or more tables in the discovery controller related to an access control zone that indicates that the subsystem interface on the subsystem is allowed to be accessed by the host interface.

8. The computer-implemented method of claim 1, wherein the network connection is a persistent explicit network connection.

9. An information handling system comprising:
   one or more host interfaces, in which each host interface comprises a host interface address;
   a centralized discovery controller (CDC) client;
   one or more processors; and
   a non-transitory computer-readable medium or media comprising one or more sets of instructions which, when executed by at least one of the one or more processors, causes steps to be performed comprising:
      in response to receiving a notification of a change in network information associated with one or more subsystems communicatively coupled to the information handling system via at least one of the host interfaces, obtaining information regarding the change; and
      in response to obtaining the information regarding the change, updating a host destination database, which correlates a subsystem identifier of a subsystem to a host interface name that is associated with a host interface for communicating with that subsystem, to enable the information handling system to access at least one of the subsystems without having to configure or update routes in an internet protocol (IP) routing table.

10. The information handling system of claim 9, wherein the network information comprises a discovery log page associated with the subsystems.

11. The information handling system of claim 9, further comprising, wherein the notification is received from a discovery controller (DC).

12. The information handling system of claim 9, wherein obtaining information regarding the change comprises communicating to a discovery controller (DC) a non-volatile memory express over Fabric (NVMe-oF) Get Log Page command to retrieve the network information.

13. The information handling system of claim 9, wherein obtaining information regarding the change comprises receiving from a discovery controller (DC) a Get Log Page response that comprises the change in the network information.

14. The information handling system of claim 9, wherein the network information comprises an IP address of at least one of the subsystems.

15. The information handling system of claim 14, wherein the CDC client performs steps comprising:
   in response to receiving, via a host interface of the one or more host interfaces, a DC IP address that identifies the DC, storing in the host destination database the DC IP address as a destination IP address and storing the host interface name; and
   using the host interface name in a transport interface parameter to establish with a CDC a persistent explicit network connection that specifies that traffic should egress from the host interface.

16. A non-transitory computer-readable medium or media comprising one or more sequences of instructions which, when executed by at least one processor of a host, causes steps to be performed comprising:
   in response to a centralized discovery controller (CDC) client receiving, via a host interface having a host interface address, a discovery controller (DC) internet protocol (IP) address that identifies a DC, storing in a destination database the DC IP address as a destination IP address and storing a host interface name; and
   using the host interface name in a transport interface parameter to establish a network connection with a CDC via the host interface.

17. The non-transitory computer-readable medium or media of claim 16, further comprising, in response to receiving, at the host interface, a destination IP address associated with a subsystem having a subsystem interface, using the transport interface parameter to specify that the host interface be used to connect with the subsystem interface to establish a connection with the subsystem.

18. The non-transitory computer-readable medium or media of claim 16, wherein the CDC client obtains the DC IP address that identifies the discovery controller in response to communicating a non-volatile memory express over Fabric (NVMe-oF) data transport protocol command to the discovery controller.

19. The non-transitory computer-readable medium or media of claim 18, wherein the NVMe-oF data transport protocol command comprises a multicast Domain Name System (mDNS) query.

20. The non-transitory computer-readable medium or media of claim 17, wherein:
   using the host interface name in the transport interface parameter causes the host to bypass a host routing table, if any, in forming the network connection;
   using the transport interface parameter to specify that the host interface be used to connect with the subsystem interface causes the host to bypass a host routing table, if any, in establishing the connection with the subsystem; or
   both.

* * * * *